(12) United States Patent
Bui

(10) Patent No.: US 7,239,680 B2
(45) Date of Patent: *Jul. 3, 2007

(54) METHODS FOR PERFORMING CHANNEL DIAGNOSTICS

(75) Inventor: Sang T. Bui, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 615 days.

This patent is subject to a terminal disclaimer.

(21) Appl. No.: 10/641,011

(22) Filed: Aug. 15, 2003

(65) Prior Publication Data

US 2004/0032921 A1    Feb. 19, 2004

Related U.S. Application Data

(63) Continuation-in-part of application No. 10/282,206, filed on Oct. 29, 2002, and a continuation-in-part of application No. 10/281,992, filed on Oct. 29, 2002.

(60) Provisional application No. 60/493,801, filed on Aug. 11, 2003, provisional application No. 60/396,127, filed on Jul. 17, 2002.

(51) Int. Cl.
  *H04B 1/10* (2006.01)
  *G01R 31/08* (2006.01)

(52) U.S. Cl. ..................... 375/350; 370/242

(58) Field of Classification Search ............... 375/219, 375/224, 230, 350; 370/241–242, 248, 290, 370/359; 379/28
See application file for complete search history.

(56) References Cited

U.S. PATENT DOCUMENTS

| | | | |
|---|---|---|---|
| 3,962,637 A | 6/1976 | Motley et al. | |
| 4,539,675 A | 9/1985 | Fisher | |
| 4,547,633 A * | 10/1985 | Szechenyi | 370/242 |
| 4,677,647 A | 6/1987 | Aoyagi | |
| 4,789,994 A | 12/1988 | Randall et al. | |
| 4,859,951 A * | 8/1989 | Cole et al. | 324/534 |

(Continued)

FOREIGN PATENT DOCUMENTS

EP    0 268 391 A1    5/1988

(Continued)

OTHER PUBLICATIONS

Maier, F.A. and Seeger, H., "Automation of optical time-domain reflectometry measurements." *Hewlett-Packard Journal*, v46, n1, p. 57(6), 4-Page Reprint, (Feb. 1995).

(Continued)

*Primary Examiner*—Emmanuel Bayard
*Assistant Examiner*—Lawrence Williams
(74) *Attorney, Agent, or Firm*—Sterne, Kessler, Goldstein & Fox PLLC

(57) ABSTRACT

A method is used to determine information about a communication channel using an adaptive filter coupled to the channel. The adaptive filter includes adaptive filter coefficients. The filter coefficients are compared to filter coefficient thresholds. A determination is made whether one of a communication link and a channel fault exists. If a channel fault exists, a determination is made whether, i) a cable open condition exists in the channel, and ii) a cable short condition exists in the channel. An indication is made whether the channel is one of linked, open, and shorted.

37 Claims, 18 Drawing Sheets

U.S. PATENT DOCUMENTS

| | | | |
|---|---|---|---|
| 5,099,436 A | 3/1992 | McCown et al. | |
| 5,155,742 A | 10/1992 | Ariyavisitakul et al. | |
| 5,166,954 A | 11/1992 | Grizmala et al. | |
| 5,210,774 A | 5/1993 | Abbiate et al. | |
| 5,351,247 A | 9/1994 | Dow et al. | |
| 5,448,369 A | 9/1995 | Lee et al. | |
| 5,481,195 A * | 1/1996 | Meyer | 324/534 |
| 5,481,564 A * | 1/1996 | Kakuishi et al. | 375/230 |
| 5,661,668 A | 8/1997 | Yemini et al. | |
| 5,751,766 A | 5/1998 | Kletsky et al. | |
| 5,872,815 A | 2/1999 | Strolle et al. | |
| 6,055,119 A | 4/2000 | Lee | |
| 6,061,393 A * | 5/2000 | Tsui et al. | 375/224 |
| 6,160,673 A | 12/2000 | Izumi et al. | |
| 6,226,356 B1 | 5/2001 | Brown | |
| 6,233,274 B1 | 5/2001 | Tsui et al. | |
| 6,278,730 B1 | 8/2001 | Tsui et al. | |
| 6,385,237 B1 | 5/2002 | Tsui et al. | |
| 6,385,561 B1 * | 5/2002 | Soraghan et al. | 702/185 |
| 6,414,990 B1 | 7/2002 | Jonsson et al. | |
| 6,434,233 B1 | 8/2002 | Bjarnason et al. | |
| 6,448,781 B1 | 9/2002 | Frank et al. | |
| 6,529,549 B1 | 3/2003 | Norrell et al. | |
| 6,534,996 B1 | 3/2003 | Amrany et al. | |
| 6,590,930 B1 | 7/2003 | Greiss | |
| 6,650,699 B1 | 11/2003 | Tierno | |
| 6,650,768 B1 | 11/2003 | Evans et al. | |
| 6,661,761 B2 | 12/2003 | Hayami et al. | |
| 6,674,518 B1 | 1/2004 | Asher et al. | |
| 6,697,768 B2 | 2/2004 | Jones et al. | |
| 6,744,854 B2 * | 6/2004 | Berrier et al. | 379/22.03 |
| 6,833,875 B1 | 12/2004 | Yang et al. | |
| 6,856,655 B1 | 2/2005 | Garcia | |
| 6,901,243 B2 | 5/2005 | Jayaraman et al. | |
| 6,934,655 B2 * | 8/2005 | Jones et al. | 702/108 |
| 6,985,521 B1 * | 1/2006 | Rezvani et al. | 375/222 |
| 2002/0114383 A1 | 8/2002 | Belge et al. | |
| 2002/0161539 A1 | 10/2002 | Jones et al. | |
| 2002/0161542 A1 | 10/2002 | Jones et al. | |
| 2002/0168001 A1 | 11/2002 | Ramsey | |
| 2002/0169585 A1 * | 11/2002 | Jones et al. | 702/189 |
| 2003/0018981 A1 * | 1/2003 | Ramsey | 725/148 |
| 2003/0152180 A1 | 8/2003 | Schenk | |
| 2003/0210752 A1 * | 11/2003 | Krupka | 375/340 |
| 2004/0013178 A1 | 1/2004 | Bui et al. | |
| 2004/0013208 A1 | 1/2004 | Bui et al. | |
| 2004/0019443 A1 | 1/2004 | Jones et al. | |
| 2004/0022195 A1 * | 2/2004 | Chen | 370/241 |
| 2004/0044489 A1 | 3/2004 | Jones et al. | |
| 2006/0007991 A1 * | 1/2006 | Wang et al. | 375/224 |
| 2006/0007992 A1 * | 1/2006 | Wang et al. | 375/224 |
| 2006/0007993 A1 * | 1/2006 | Wang et al. | 375/224 |
| 2006/0067239 A1 * | 3/2006 | Olinski | 370/242 |

FOREIGN PATENT DOCUMENTS

| | | |
|---|---|---|
| WO | WO 01/030013 | 8/2002 |

OTHER PUBLICATIONS

Navaneethan, S. et al., "Automatic Fault Location for Underground Low Voltage Distribution Networks," *IEEE Transactions On Power Delivery*, vol. 16, No. 2, pp. 346-351 (Apr. 2001).

Bellanger, M.G., *Adaptive Digital Filters and Digital Analysis*, 1987, pp. 313-314.

European Search Report for European Patent Appl. No. 03016209.3, 3 pages, dated Sep. 27, 2005.

* cited by examiner

238

500A

ND FOR PERFORMING CHANNEL
METHODS FOR PERFORMING CHANNEL DIAGNOSTICS

CROSS-REFERENCE TO RELATED APPLICATIONS

This application claims the benefit of U.S. Prov. App. No. 60/493,801, filed Aug. 11, 2003, entitled "Methods for Performing Channel Diagnostics." This application is also a continuation-in-part of U.S. Ser. No. 10/282,206 filed Oct. 29, 2002, entitled "Cable Diagnostic System and Method," and is a continuation-in-part of U.S. Ser. No. 10/281,992, filed Oct. 29, 2002, entitled "Method and Apparatus for Determining A Receiver Sampling Phase for Use in Diagnosing a Channel," which both claim the benefit of U.S. Prov. App. No. 60/396,127, entitled "Cable Diagnostic System and Method," filed Jul. 17, 2002, all of which are incorporated by reference herein in their entireties.

BACKGROUND

1. Field of Invention

The present invention relates generally to communication devices and related methods, and more particularly, to such a device using an adaptive filter.

2. Related Art

A known communication system includes a pair of transceivers that communicate with each other over a communication channel, such as a wire or optical cable. A known receiver includes an analog-to-digital converter (ADC) for sampling a receive signal in accordance with a sample clock having a sample clock phase, to produce a digitized receive signal. An adaptive filter, in a demodulator following the ADC, adaptively filters the digitized signal. Typically, the sample clock phase affects the performance of the adaptive filter. Therefore, it is desirable to set the sample clock phase to a phase value that maximizes performance.

On occasion, a fault (e.g., an open circuit, a short circuit, or the like) in the communication channel inhibits communication between the transceivers. It is desirable to be able to determine whether such a fault exists. If such a channel fault exists, it is desirable to determine useful information about the fault, such as its location in the channel. If no fault exists, it is desirable to be able to determine information about the communication channel, such as the length of the channel. It is also desirable to be able to determine the above-mentioned information about the channel without having to examine the channel physically.

Therefore, what is needed is a system and method for determining whether or not a fault exists. If a fault exists, what is needed is a system and method to determine a type and location of the fault. If no fail exists, what is needed is a system and method to determine a length of the communication channel. A system and method for determining a link between transceivers on opposite ends of the channel is also needed.

BRIEF SUMMARY OF THE INVENTION

Embodiments of the present invention provide a method of determining information about a communication channel using an adaptive filter coupled to the channel. The adaptive filter includes adaptive filter coefficients. The filter coefficients are compared to filter coefficient thresholds. A determination is made whether one of a communication link and a channel fault exists. If a channel fault exists, a determination is made whether, i) a cable open condition exists in the channel, and ii) a cable short condition exists in the channel. An indication is made whether the channel is one of linked, open, and shorted.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers may indicate identical or functionally similar elements.

DETAILED DESCRIPTION OF THE INVENTION

Hardware Based Systems and Methods for Cable Diagnostics

Figure 1:
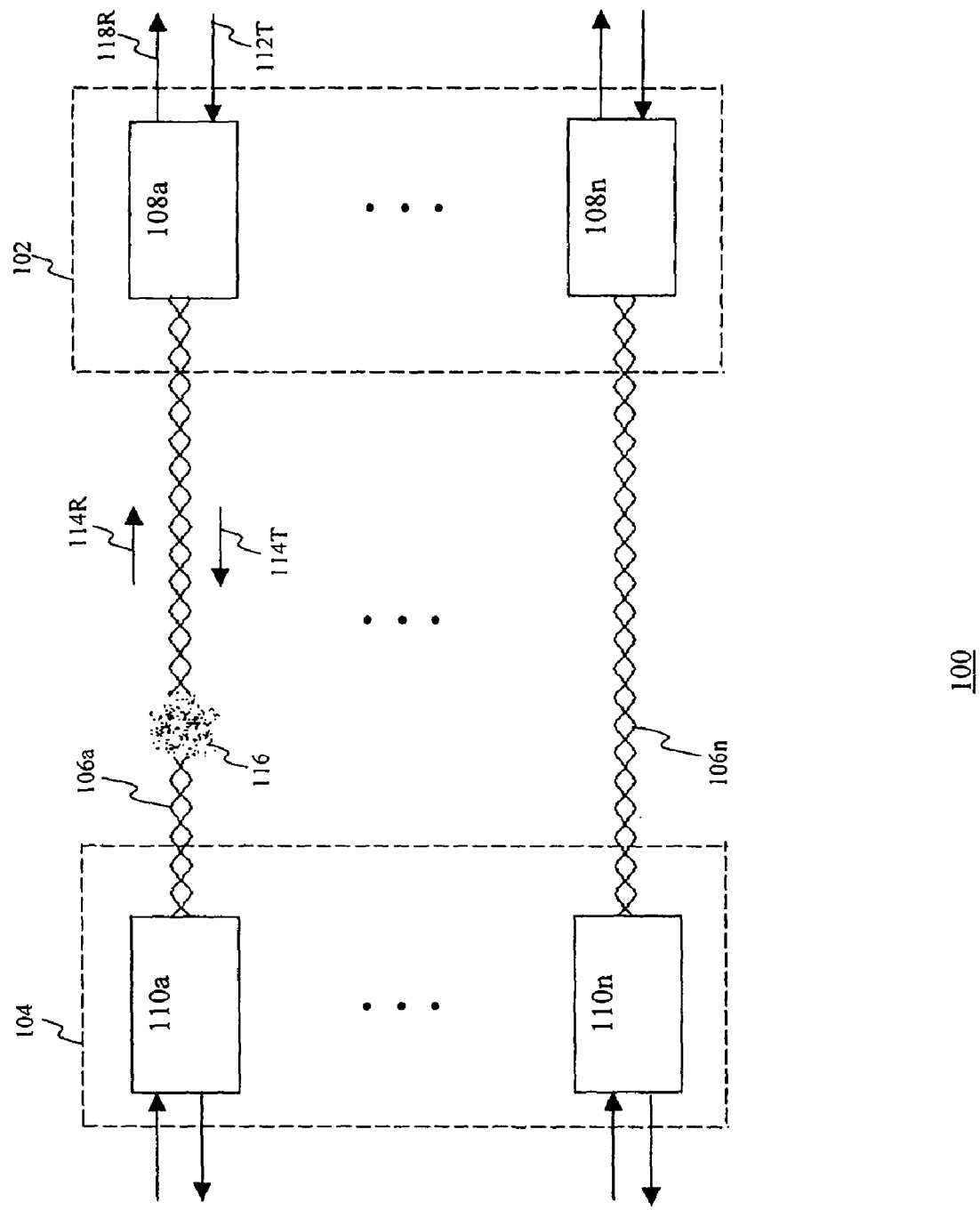
FIG. 1 is a block diagram of an example communication system in which the present invention can operate.

FIG. 1 is an example communication system 100 in which the present invention can operate. System or environment 100 includes a transmitter/receiver (transceiver) assembly 102 and a transceiver assembly 104, which communicate with each other over communication channels 106a–106n. Transceiver assembly 102 includes transceivers 108a–108n, coupled respectively to communication channels 106a–106n. Transceiver assembly 104 includes transceivers 110a–110n respectively coupled to communication channels 106a–106n. Communication channels 106 may include wire and/or optical cables. The terms "channel" and "cable" are used equivalently and interchangeably herein.

In operation, transceiver 108a receives an input symbol stream 112T from an external data source, not shown. Transceiver 108a generates a transmit symbol stream or signal 114T from input symbol stream 112T, and transmits the symbol stream to corresponding transceiver 110a over communication channel 106a. Transceivers 108a and 110a are said to be communication "link partners," because they establish a communication link between, and then communicate with, each other over communication channel 106a.

Transceiver 108a receives a receive signal 114R from communication channel 106a. Receive signal 114R may include a transmit signal originated from transceiver 110a. Additionally and/or alternatively, receive signal 114R represents energy from transmit signal 114T that has been reflected back toward transceiver 108a. Transmit signal 114T may be reflected from a channel fault 116 in channel 106a (such as a break in the channel) and/or from an impedance mismatch at a coupling section between channel 106a and transceiver assembly 104. Such reflected energy represents an "echo."

Transceiver 108a receives symbol stream 114R, and derives a corrected, adaptively filtered output stream 118R from symbol stream 114R.

Figure 2:
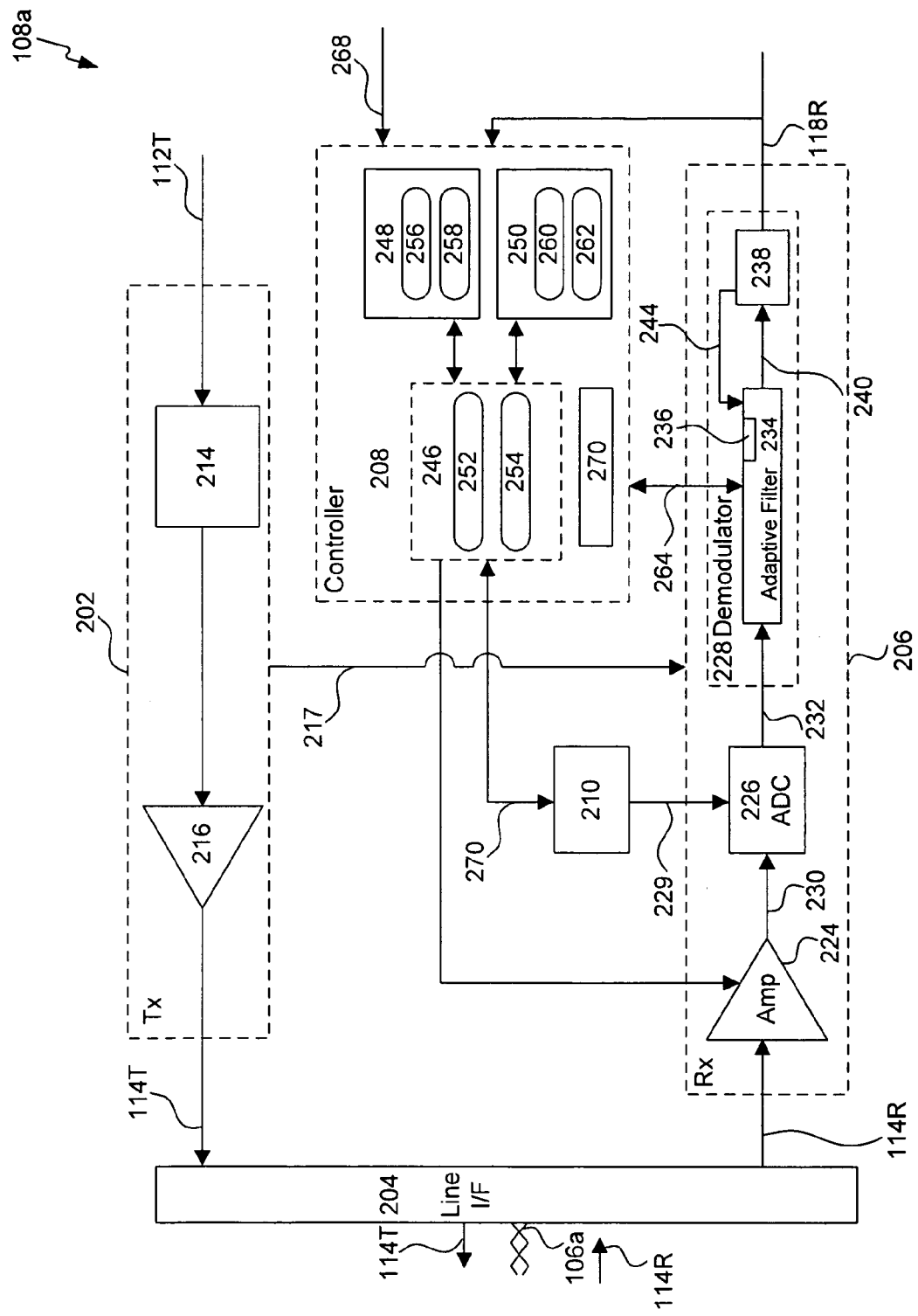
FIG. 2 is a block diagram of an example system, constructed and operated in accordance with the principles of the present invention, which expands on a transceiver of FIG. 1.

FIG. 2 is a block diagram of an example arrangement of transceiver 108a. Transceiver 108a includes a transmit path 202, a line interface 204, a receive path 206, a controller module 208, and a receive sample clock generator 210. Transmit path 202 includes a modulator 214 and a transmit amplifier 216. Together, modulator 214 and transmit amplifier 216 generate transmit symbol stream or signal 114T from input symbol stream 112T. Line interface 204 couples transmit signal 114T to communication channel 106a. Also, transmit path 202 provides a signal 217 representative of transmit symbol stream 114T to receive path 206. Signal 217 may be a digital signal or an analog signal representation of transmit signal 114T.

Line interface 204 couples receive signal 114R to receive path 206. Receive path 206 includes a variable gain amplifier 224, an analog-to-digital converter (ADC) 226, and a demodulator 228, connected in series. Amplifier 224 amplifies signal 114R, and provides an amplified receive signal 230 to ADC 226. ADC 226 samples signal 230 in accordance with an ADC sample clock signal 229, generated by sample clock generator 210, to produce a digitized receive signal 232.

ADC 226 provides signal 232 to demodulator 228. Demodulator 228 includes an adaptive filter 234 followed by a post-filtering stage 238. Demodulator 228 and adaptive filter 234 receive transmit replica signal 217 from transmit path 202. In the exemplary arrangement of transceiver 108a depicted in FIG. 2, adaptive filter 234 is coupled to communication channel 106a through components 204, 224 and 226. However, other arrangements for coupling the adaptive filter to the communication channel are possible, as would be apparent to one of ordinary skill in the relevant art(s) given the present description.

Adaptive filter 234 generally represents any number of adaptive signal processors including, but not limited to, an echo canceler and an equalizer. In a preferred arrangement of the present invention, adaptive filter 234 includes an adaptive echo canceler that uses transmit replica signal 217 to subtract-out echoes included in receive signal 114R. In another arrangement, adaptive filter 234 includes an adaptive equalizer that equalizes receive signal 114R. Adaptive filter 234 may operate as both an equalizer and an echo canceler, and may also provide adaptive filtering in addition to echo canceling and equalization. Thus, adaptive filter 234 may include at least one of an adaptive echo canceler and an adaptive equalizer. Further details regarding the operation of such signal processing elements are provided in co-pending U.S. Non-Provisional application Ser. No. 09/693,232, entitled DIAGNOSTICS OF CABLE AND LINK PERFORMANCE FOR A HIGH-SPEED COMMUNICATION SYSTEM, by O. Agazzi et al., filed Oct. 19, 2000, incorporated herein by reference in its entirety.

Adaptive filter 234 processes signal 232, in accordance with a set of adaptive filter coefficients 236 produced by the filter, to produce a processed (e.g., adaptively filtered) receive signal 240. Adaptive filter coefficients 236 generally represent adaptive filter, adaptive echo canceler, and/or adaptive equalizer coefficients, whereby adaptive filter 234 adaptively filters, adaptively echo cancels, and/or adaptively equalizes signal 232, respectively. Post-filtering stage 238 further processes signal 240 to produce corrected, adaptively filtered output stream 118R. Post-filtering stage 238 also derives a feedback error signal 244, and provides the error signal to adaptive filter 234.

Controller module 208 controls transceiver 108a. Controller module 208 includes controller logic 246, a memory 248 for storing a polynomial constant database, and a memory 250 for storing a threshold database. Controller logic 246 includes a channel diagnostic module 252 and a phase tuner and timing recovery module 254. The polynomial constant database stored in memory 248 includes a first set of polynomial constants 256 indicative of channel faults, and a second set of polynomial constants 258 indicative of channel length. Likewise, the threshold database stored in memory 250 includes a first set of thresholds 260 indicative of channel faults, and a second set of thresholds 262 indicative of channel length.

Controller logic 246 accesses the polynomial constant database stored in memory 248 and the threshold database stored in memory 250 as needed by channel diagnostic module 252 in order to execute methods of the present invention.

Controller logic 246 controls adaptive filter 234 through an interface 264. For example, controller 208 issues commands to filter 234, and accesses filter coefficients 236 through interface 264. Controller 208 stores filter coefficients in a controller memory 270.

Transceiver 108a includes a user interface 268 that supports user interaction with the transceiver through input/output (I/O) operations. For example, a user may program databases memories 248 and 250 through interface 268, and controller 208 may report test results to the user through the interface.

Controller 208 also controls sample clock generator 210 over an interface 272. For example, controller 208 issues sampling phase commands to generator 210 over interface 272. In turn, generator 210 generates sample clock signal 229 at sampling phases in accordance with the sampling phase commands. ADC 226 samples signal 230 in accordance with the sampling phases of clock signal 229 to produce sampled signal 232.

Controller 208 also controls the gain of variable gain amplifier 224.

Figure 3:
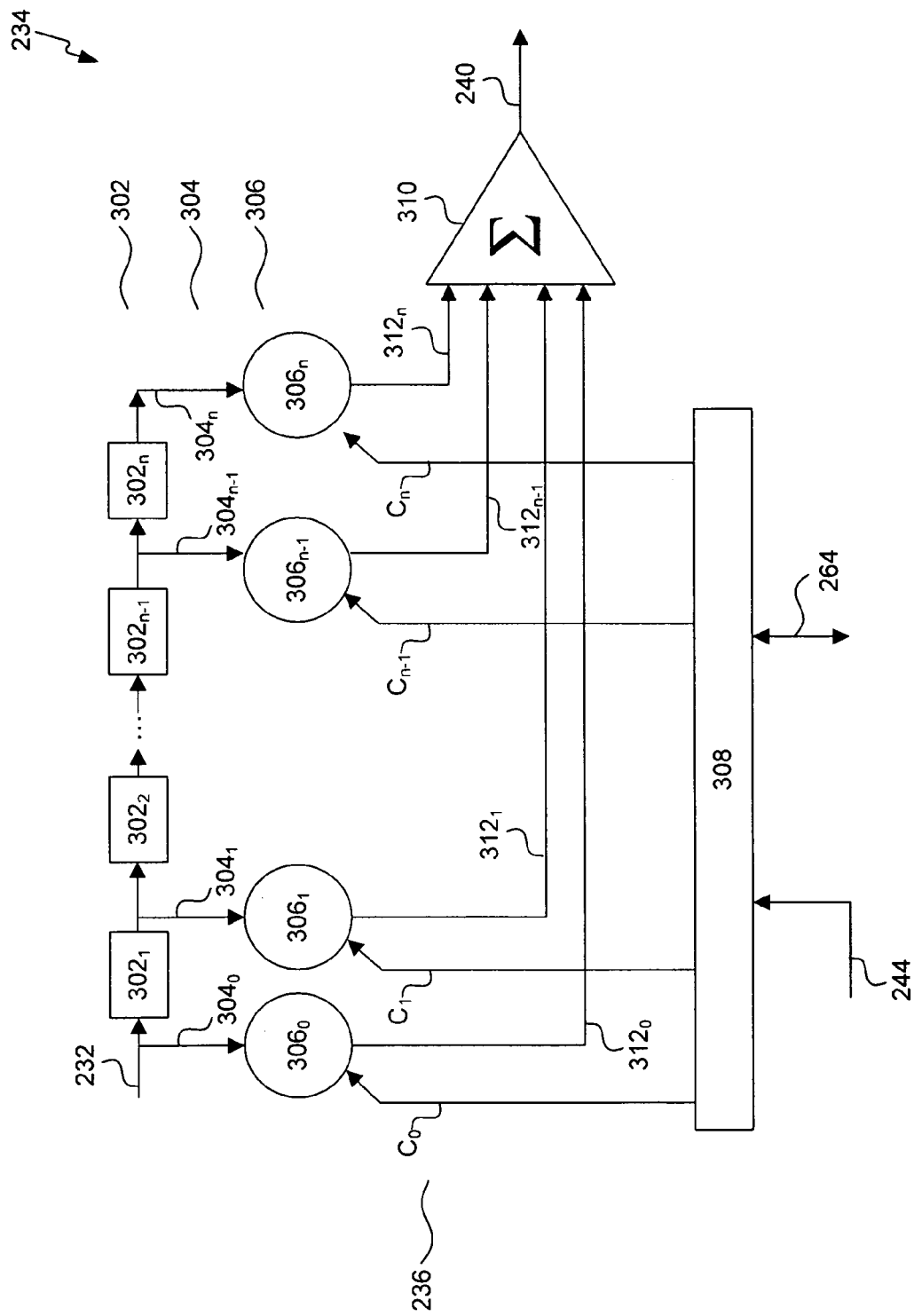
FIG. 3 is a block diagram of an example arrangement of an adaptive filter of FIG. 2.

FIG. 3 is a block diagram of an example arrangement of adaptive filter 234. Adaptive filter 234 includes a series of time delay elements 302, a set of signal taps 304 coupled to delay elements 302, a set of multipliers 306 coupled to taps 304, an adaptive coefficient adjustment module 308, and a summer 310. Time delay elements $302_1$–$302_n$ successively delay digitized receive signal 232 and feed taps $304_1$ to $304_n$ (where subscripts 1–n indicate tap numbers) with successively delayed representations or portions of signal 232. As depicted in FIG. 3, non-delayed signal 232 feeds tap $304_0$ directly, while successively delayed representations or portions of signal 232 produced by delay elements $302_1$–$302_n$ feed respective taps $304_1$–$304_n$. Each tap $304_0$–$304_n$ feeds a respective one of multipliers $306_0$–$306_n$. With the example tap numbering convention adopted in FIG. 3, an increase in tap number corresponds to an increase in time delay in filter 234.

Module 308 generates adaptive filter coefficients 236 (labeled in FIG. 3 as filter coefficients $C_0$–$C_n$) based on feedback error signal 244, and provides each of the coefficients to a respective one of multipliers $306_0$–$306_n$, as depicted in FIG. 3.

Multipliers $306_0$–$306_n$ produce product signals $312_0$–$312n$ based on filter coefficients $C_O$–$C_n$ and the respective successively delayed signals associated with taps $304_0$–$304_n$. Summer 310 sums product signals $312_0$–$312_n$ to produce processed signal 240.

Figure 4:
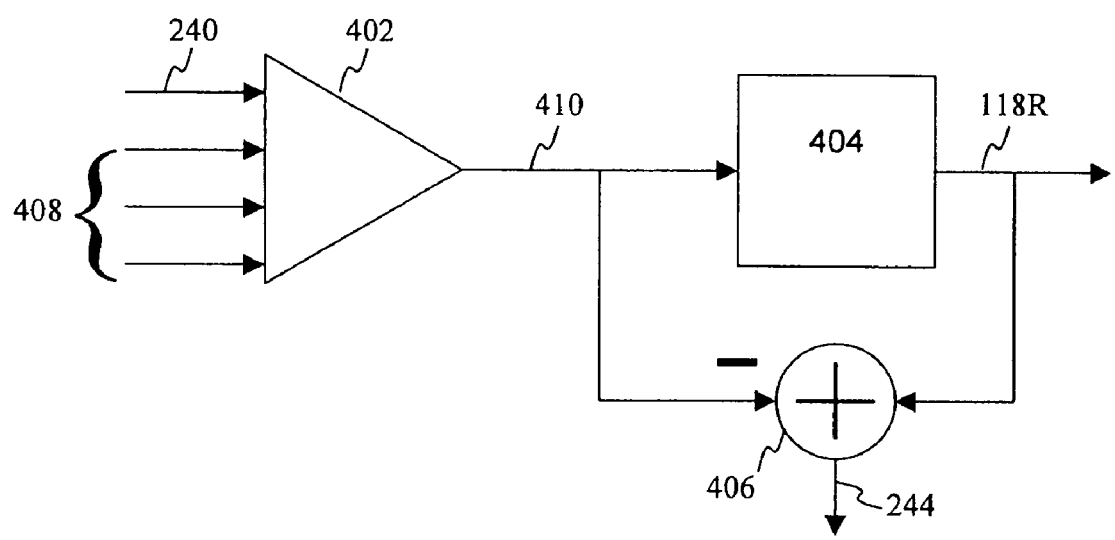
FIG. 4 is a block diagram of an example arrangement of a post filter stage of FIG. 2.

FIG. 4 is a block diagram of an example arrangement of post-filtering stage 238. In the depicted arrangement, a signal summer 402 sums processed signal 240 with signals 408 from other filters (not shown) to produce a "soft decision" signal 410. By "soft decision" it is meant that signal 410 may take on a range of different values, instead of just one of two logic values (for example, logic "1" and logic "0"). In an alternative arrangement, signals 408 are omitted. A slicer 404 processes soft decision signal 410 to produce corrected output stream 118R, including a stream of "hard decisions" (such as logic "1s" and logic "0s"). Corrected output stream 118R includes hard decisions made by slicer 404. A comparator 406 compares soft decision signal 410 to corrected output stream 118R to produce feedback error signal 244.

Figure 5:
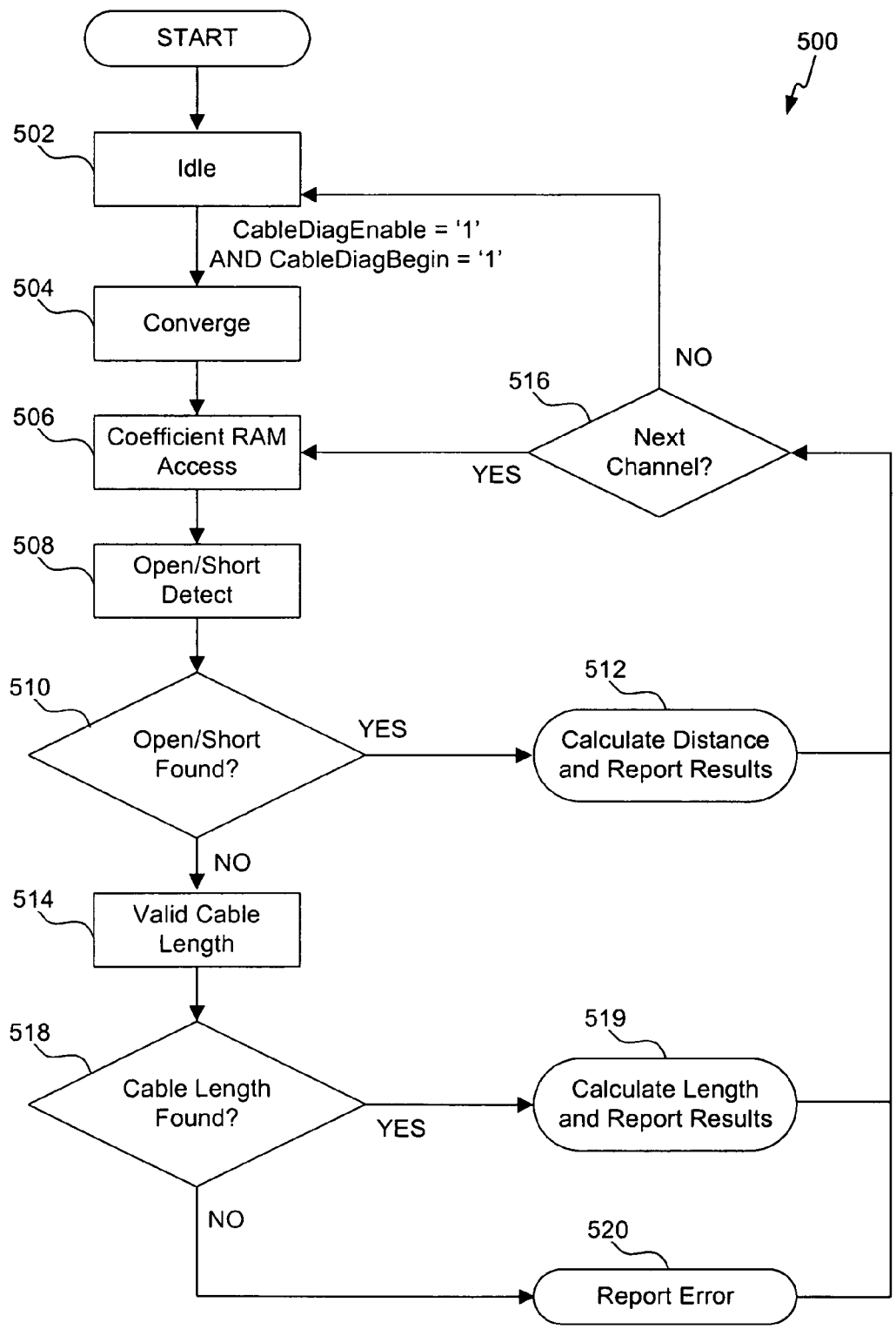
FIG. 5 is a flowchart of an example method of determining information about a channel based on filter coefficients and corresponding filter coefficient thresholds.
Figure 6:
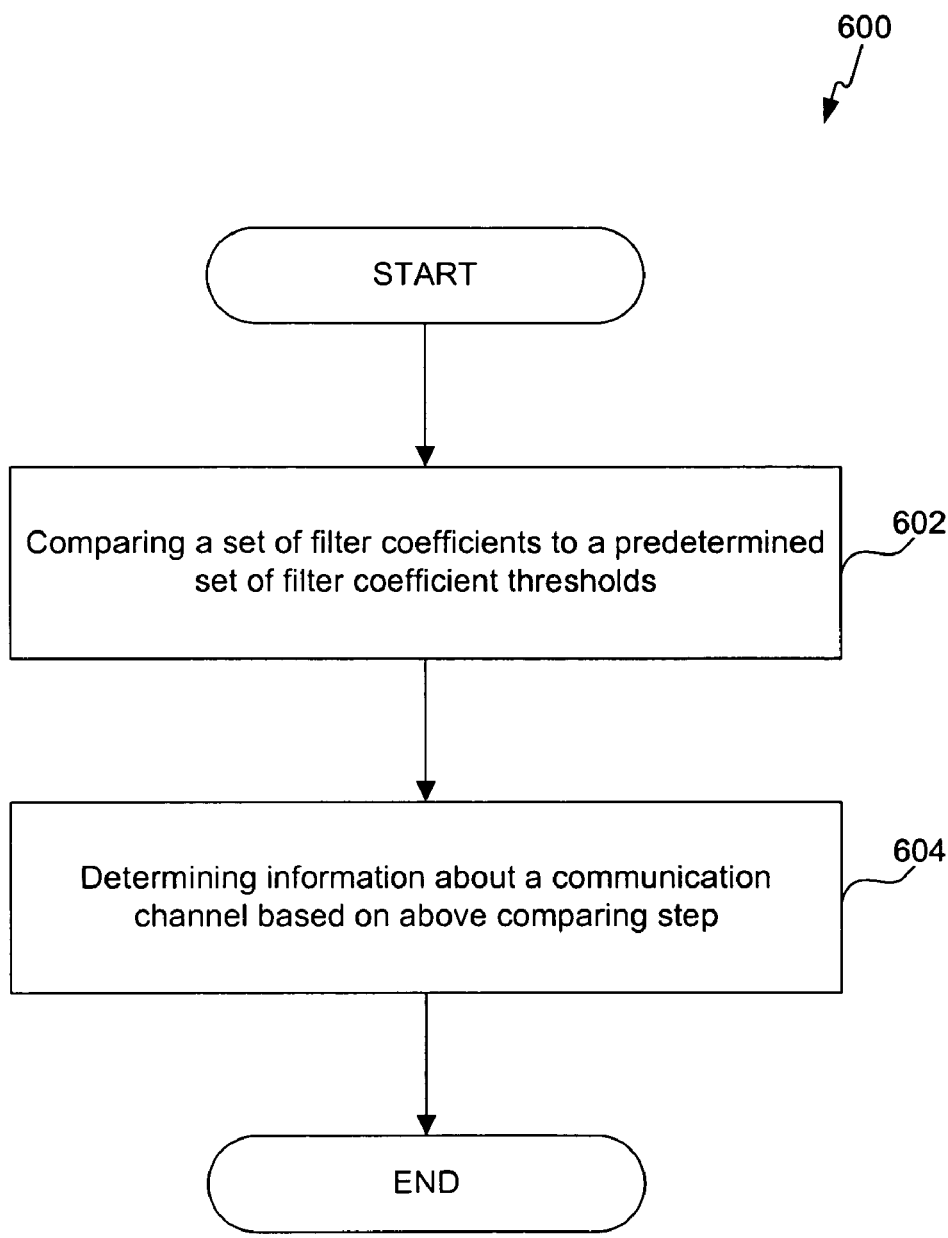
FIG. 6 is a flowchart of another example method of determining information about a communication channel.
Figure 7:
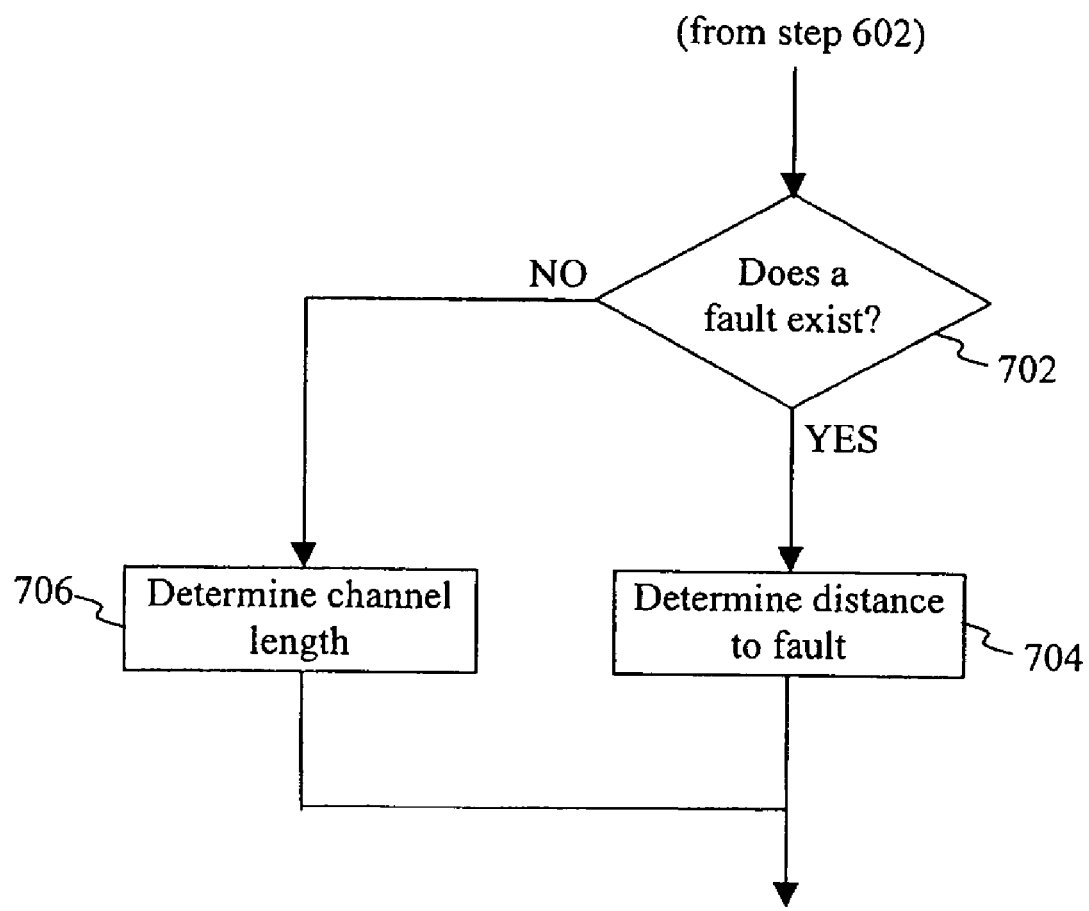
FIG. 7 is a flowchart further expanding on the method of FIG. 6.

Presented below in connection with FIGS. 5–7 are exemplary methods of determining information about a communication channel using an adaptive filter coupled to the channel, according to the present invention. The adaptive filter (for example, filter 234) reverses the negative effects of a noisy and distortive transmission medium (such as channel 106a). The output of the filter (for example, signal 240 or signal 118R) is a best-guess estimate of the symbol stream the link partner's transmitter sends (for example, the symbol stream transmitted by the transmitter in remote transceiver 110a). As described above, the filter includes a series of multiply-and-add stages (for example, components 306 and 310) that operate on the received data stream (for example, signal 232). Each multiplier (for example, multiplier $306_i$) has an associated filter coefficient (for example, filter coefficient $C_i$) that adapts itself to the characteristics of the received data stream such that the filter reverses the noise and distortion effects of the channel.

The methods described below use the series/set of filter coefficients mentioned above. According to the present invention, these filter coefficients adapt to channel conditions, and when interpreted properly, provide valuable information about the channel. For example, cable faults (including a severed connection or "open circuit," and a fused connection or "short circuit") can be determined by comparing the filter coefficients to a predetermined set of filter coefficient fault thresholds that set a limit on reasonable values of the filter coefficients corresponding to non-fault channel conditions. An abnormally enlarged filter coefficient that exceeds one such predetermined threshold indicates a fault in the channel. Also, a good approximation of the distance between the filter (in the transceiver) and such an indicated channel fault can be calculated based on the tap number corresponding to the enlarged coefficient. In addition, when no channel fault exists, a good approximation of the channel length can be determined by comparing the filter coefficients to a different set of predetermined thresholds indicative of channel length when no channel fault exists, and finding the tap number of any coefficient that exceeds one of these thresholds.

The filter coefficients exceed the above mentioned thresholds for the following reason. Channel faults (and similarly, the coupling between the end of the channel and the remote transceiver or link partner) cause an impedance mismatch in the channel. Thus, the fault (or channel-end coupling) returns substantial reflections of the transmitted signal, that originated at the transmitter (for example, transmitter 202), back to the adaptive filter (for example, adaptive filter 234). The adaptive filter attempts to remove the effects of the reflections or echoes by enlarging some of the filter coefficients. The longer the distance between the transceiver (for example, transceiver 108a) and the channel fault, the longer it takes for the reflection to return to the adaptive filter, and the larger the tap number(s) of the enlarged coefficients. Also, the longer the distance between the transceiver and the channel fault or coupling, the smaller the amplitude of the reflected signal, and the less the corresponding filter coefficient values are enlarged.

Another way of looking at this process is as follows. Under normal conditions, the adaptive filter receives the transmitted signal from its associated transmitter, as the line interface initially couples the transmitted signal to the channel. By storing delayed copies of the transmitted signal in the filter delay elements, and adjusting the corresponding coefficient values, the adaptive filter adjusts to the "timing" of the transmitted signal in the channel. Such timing of the transmitted signal is inherently represented by the adapted filter coefficients.

With regard to channel length determinations, when an echo of the transmitted signal arrives at the adaptive filter relatively soon after the initial transmission of the transmitted signal, one or more of the relatively earlier filter coefficients (that is, filter coefficients corresponding to smaller tap numbers) will self-adjust to a larger coefficient value, that exceeds its respective threshold. The methods described below will then report that the cable is relatively short because of the "soon after" arrival of the echo.

On the other hand, when an echo of the transmitted signal arrives at the adaptive filter a relatively long time after the initial transmission of the transmitted signal, then one or more of the relatively later (larger tap number) filter coefficients will have a higher-than-normal value that exceeds the respective threshold, and the method will report a relatively longer cable length due to the later arrival of the echo.

FIG. 5 is a flowchart of an example method 500 of diagnosing one or more communication channels, such as channels 106a–106n depicted in FIG. 1, based on filter coefficients and corresponding filter coefficient thresholds. That is, method 500 determines information about the communication channels. By way of example, method 500 is described in the context of transceiver 108a. Method 500 may be implemented under control of controller 208 in the transceiver 108a.

Method 500 includes a first step 502 ("idle"). Idle is the state where the method is at rest.

In an example operational scenario, transceivers 108a and 110a attempt to establish a valid communication link between themselves, to enable communication over the valid link (and communication channel 106a). To do this, transceivers 108a and 110a traverse a communication link setup protocol. Typically, this includes exchanging initial hand-shaking signals, and verifying a valid link has been established, as would be apparent to one of ordinary skill in the relevant art(s).

When a valid link exists, filter coefficients $C_0$–$C_n$ (collectively referred to as filter coefficients C) have properly converged to settled coefficient values. That is, filter coefficients C have had sufficient time to adapt to, and therefore indicate, the characteristics and/or conditions of communication channel 106a. Thus, converged coefficients provide useful information about communication channel 106a.

In practice, a valid link may not exist between link partner transceivers 108a and 110a. For example, there may be a fault, such as a break, in communication channel 106a, or transceiver link partner 110a may not be connected to the communication channel. When a valid link does not exist, filter coefficients C can be in an indeterminate (non-converged) state, thus provide little or no useful information about channel 106a.

Method 500 overcomes or avoids indeterminate filter coefficients in a step 504 ("converge"). In step 504, controller 208 instructs adaptive filter 234, over interface 264, to converge filter coefficients C. In step 504, adaptive filter 234 performs a convergence, and filter coefficients C adapt properly to characteristics of channel 106a. Step 504 includes initializing the filter coefficients C to initial values, and then permitting the initialized coefficients to settle to converged values based on the receive signal (e.g., signal 232), for example, while adaptive filter 234 performs filtering, echo canceling, and/or equalization. After convergence, converged filter coefficients C indicate useful information about channel 106a. Note that step 504 is an optional step.

In a step 506 ("coefficient RAM Access"), controller 208 accesses converged filter coefficients C and stores them in memory 270 of the controller.

A next step 508 ("open/short detect") is a comparison step that is part of testing channel 106a for open or short channel fault conditions that may be caused, for example, by a break in the channel. This step includes comparing filter coefficients C to thresholds 260 indicative of channel faults (also referred to as open/short thresholds 260).

In an embodiment, step 508 includes comparing an absolute value of each of the filter coefficients C to a corresponding one of the open/short thresholds 260, sequentially beginning with the filter coefficient corresponding to the signal tap having the least amount of time delay (e.g., in the signal tap order $304_0$–$304_n$). This comparison searches for the first one of filter coefficients C that is found to exceed its corresponding one of the open/short thresholds 260. Such a filter coefficient would represent the existence of a fault. Processing the filter coefficients in an order of increasing tap number (i.e., time delay) identifies channel faults nearest transceiver 108a.

A next step 510 ("open/short found?") is a decision step. If step 508 detected a filter coefficient among filter coefficients C that exceeded its corresponding one of the open/short thresholds 260, then a channel fault (e.g., channel fault 116 in channel 106a) is identified, and step 510 returns a "YES" signal. Method 500 then proceeds to a step 512 ("calculate and report results"). If step 508 did not detect a coefficient representing the existence of a channel fault, then step 510 returns a "NO" signal and method 500 proceeds to a step 514 ("valid channel length").

Step 512 includes calculating a distance to the channel fault detected in step 508 and reporting the results over user interface 268. To determine the distance between transceiver 108a and channel fault 116, controller 208 determines the tap number (t) of the first one of the filter coefficients C that was found in step 508 to exceed its corresponding one of the open/short thresholds 260. Controller 208 processes the tap number (t) in accordance with the following:

$$A*t+B=\text{length}$$

where:

"*" represents the multiplier operator,

A and B are predetermined polynomial values in the first set of constants 256 indicative of channel faults, t is the tap number corresponding to the coefficient that exceeds its corresponding one of the open/short thresholds 260, and length is the distance from the transceiver/adaptive filter to the channel fault (e.g. channel fault 116).

The length can be reported over user interface 268. In addition, status flags may be set, such as status bits in a register associated with controller 208, indicating the fault process has completed and that a channel fault was found.

If a fault was not detected, then flow proceeds from step 510 to step 514, as mentioned above. Step 514 is a comparison step, wherein filter coefficients C are compared to thresholds 262 indicative of channel length (also referred to as length thresholds 262).

Step 514 is similar to step 508, except that the thresholds used are length thresholds 262. Also, filter coefficients C are compared to corresponding ones of length thresholds 262 in a reverse order with respect to the order of comparison of step 508. That is, the filter coefficients C are traversed sequentially beginning with the coefficient corresponding to the signal tap having the most amount of time delay (e.g., in the signal tap order $304_n$–$304_0$). If a filter coefficient is found to exceed its corresponding one of the length thresholds 262, then such a coefficient would be useful for calculating channel length in a later step (step 519, discussed below).

A next step 518 ("valid channel length?") is a decision step. If step 514 detected a filter coefficient among filter coefficients C that exceeded its corresponding one of the length thresholds 262, then step 518 returns a "YES" signal. Method 500 then proceeds to a step 519 ("calculate length and report results"). If step 514 did not detect a coefficient useful for calculating length, then step 518 returns a "NO" signal and method 500 proceeds to a step 520 ("report error").

In step 519, controller 208 determines the tap number (t) associated with the first coefficient that was found in step 514 to exceed its corresponding one of the length thresholds 262. Controller 208 processes the tap number (t) in accordance with the following:

$$C*t+D=\text{length}$$

where:

C and D are predetermined polynomial values in the second set of constants 258 indicative of channel length, t is the tap number, and length is the channel length (e.g. the length of channel 106a). The length can be reported to or accessed by a user through user interface 268. In addition, status flags may be set, such as bits in a register associated with controller 208, indicating that length has been determined and that no channel fault was found.

Step 520 includes reporting an error to user interface 268 if no filter coefficient among filter coefficients C is found to exceed its corresponding one of the length thresholds 262

After channel information has been determined in steps 512, 519, or after an error has been reported in step 520, flow proceeds to a next step 516 ("next channel?"). Step 516 includes determining whether a further non-diagnosed channel exists. For example, if only channel 106a has been diagnosed, channels 106b–106n are yet to be diagnosed. If a non-diagnosed channel exists, step 516 returns a "YES" signal and method 500 returns to step 506. If no non-diagnosed channel exists, step 516 returns a "NO" signal and flow returns to step 502. In the case of some Ethernet systems, for example, there are four wire pairs (that is, channels) connected to each transceiver, so method 500 continues to analyze the next three wire pairs in search of channel faults, until all four wire pairs (that is, channels) are completed. After all the channels are analyzed, flow returns to step 502.

Figure 5A:
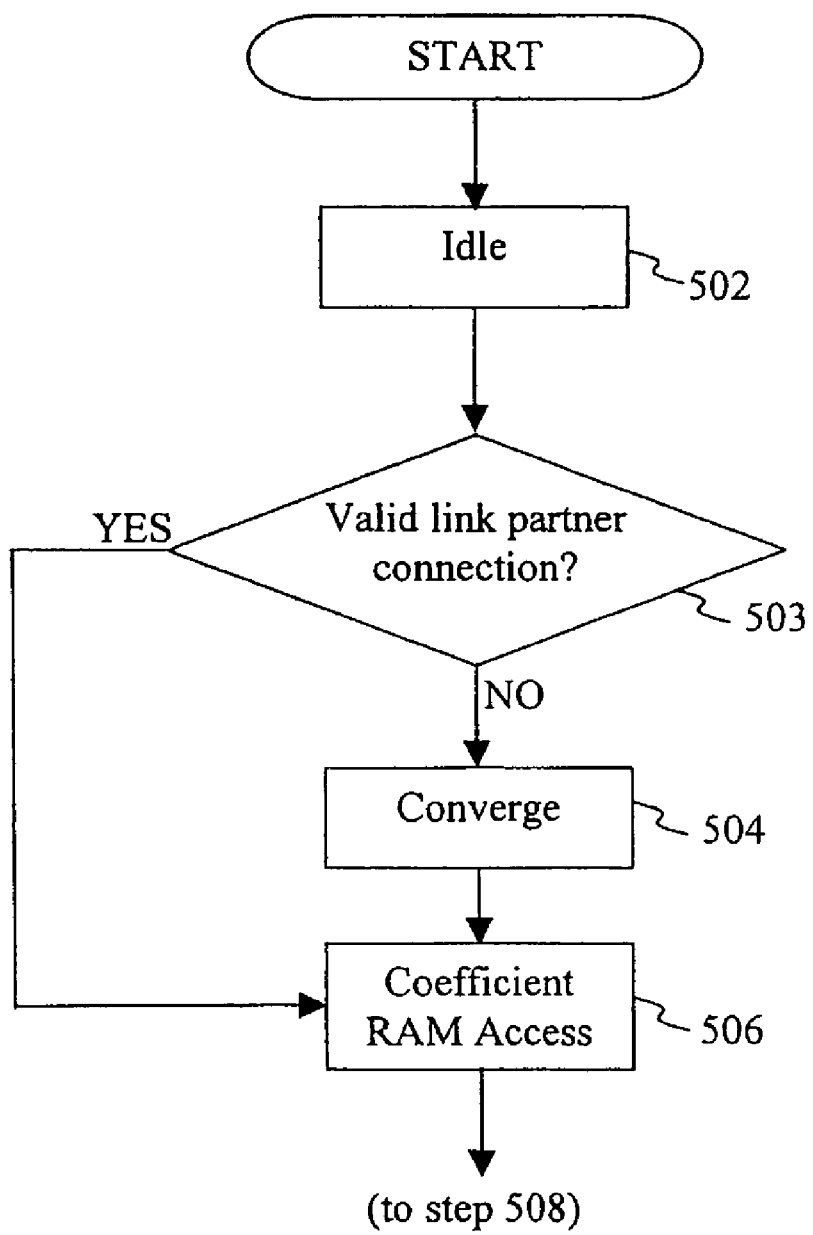
FIG. 5A is a flowchart of an alternative method related to the method of FIG. 5.

FIG. 5A is a flowchart of an alternate method 500A related to the beginning portion of method 500. This alternative method 500A is referred to as "the Natural Link" variation of method 500. Method 500A takes advantage of the fact that if a valid link has already been achieved, then filter coefficients C are guaranteed to be converged properly and thus information about the channel is readily available. Forcing a new convergence of the adaptive filter would not be beneficial, and could even result in a loss of receive data. Thus, the convergence step 504 may be skipped under such circumstances.

Thus, according to the method of 500A, a decision step 503 is inserted after idle step 502. If a valid communication link partner exists, step 503 returns a "YES" and flow skips to next step 506. That is, flow bypasses convergence step 504 of method 500. On the other hand, if a valid communication link partner does not exist, then step 503 returns a "NO" and flow continues to step 504.

When method 500A is enabled, the gain of variable gain amplifier 224 is maintained at a proper gain value, which in turn, decreases the absolute values of many of the filter coefficients C. In this case, a more uniform threshold can be applied to all the coefficients, instead of the stepped thresholds that are used for both the Open/Short and cable length comparisons/determinations discussed above.

FIG. 6 is a flowchart of another example method 600 of determining information about a communication channel. A first step 602 includes comparing the set of adaptive filter coefficients 236 to a predetermined set of filter coefficient thresholds, such as the first set of thresholds 260 indicative of fault, and/or the second set of thresholds 262 indicative of channel length. Step 602 corresponds to comparison step 508 or comparison step 514 of method 500.

Step 604 includes determining information about the channel based on comparing step 602. Step 604 corresponds to determining steps 510 and 512 or determining steps 518 and 519 of method 500. According to method 600, determining (i) channel faults and distances thereto, and (ii) channel length, may be considered as independent methods.

In an embodiment where step 604 corresponds to determining if a channel fault exists, step 604 includes determining a filter coefficient corresponding to a minimum time delay (that is, corresponding to a lowest tap number) among filter coefficients that exceed their respective threshold. For example, if more than one enlarged filter coefficients among filter coefficients C exceed their respective thresholds indicative of channel faults, then step 604 determines fault information based on the enlarged filter coefficient corresponding to the lowest time delay (that is, lowest tap number) among the enlarged filter coefficients.

In an embodiment where step 604 corresponds to determining channel length, step 604 includes determining a filter coefficient corresponding to a maximum time delay (that is, corresponding to a highest tap number) among filter coefficients that exceed their respective threshold. For example, if more than one enlarged filter coefficients among filter coefficients C exceed their respective thresholds indicative of channel length, then step 604 determines channel length based on the enlarged filter coefficient corresponding to the highest time delay (that is, highest tap number) among the enlarged filter coefficients.

FIG. 7 is a flowchart expanding on step 604. A decisions step 702 includes determining whether a channel fault exists based on comparison step 602. If a channel fault exists, step 702 returns a "YES" signal, and flow proceeds to a step 704. If no channel fault exists, step 702 returns a "NO" signal, and flow proceeds to a step 706.

Step 704 includes calculating a distance to the channel fault (and corresponds to step 512 in FIG. 5).

Step 706 includes calculating a channel length (and corresponds to step 519 in FIG. 5).

Figure 7A:
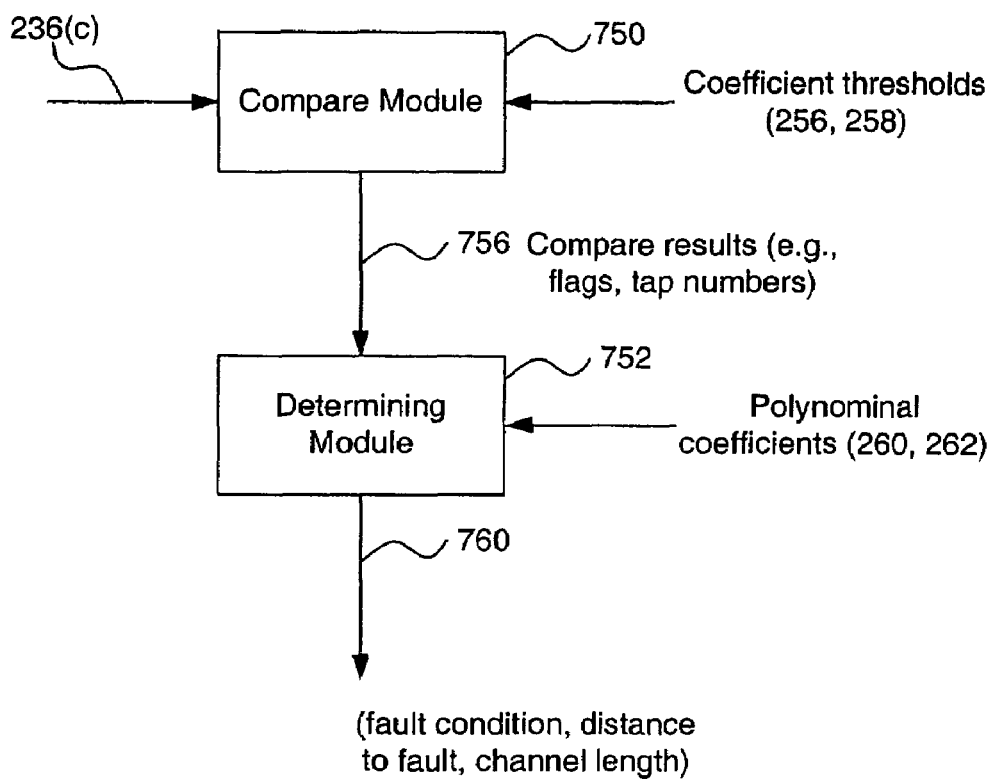
FIG. 7A is a block diagram of a diagnostic module in a controller of the transceiver of FIG. 2.

FIG. 7A is a block diagram of an example arrangement of diagnostic module 252 of controller 208. Module 252 includes a compare module 750 coupled to a determining module 752. Compare module 750 includes comparing logic (such as one or more comparators) for comparing filter coefficients C to corresponding members of the coefficient threshold sets 256 and 258, in the manner described above. Compare module 750 produces compare results 756 based on these comparisons. Compare results 756 may include flags indicating which, if any, of the filter coefficients exceed their respective thresholds, for example.

As inputs, determining module 752 receives compare results 756, polynomial coefficients from databases 260 and 262, and tap numbers corresponding to filter coefficients C. Based on these inputs, determining module 752 can determine whether a channel fault exists, the distance to such a fault, or the channel length, in the manner described above. Determining module 752 produces these determinations as a results signal 760.

Figure 8:
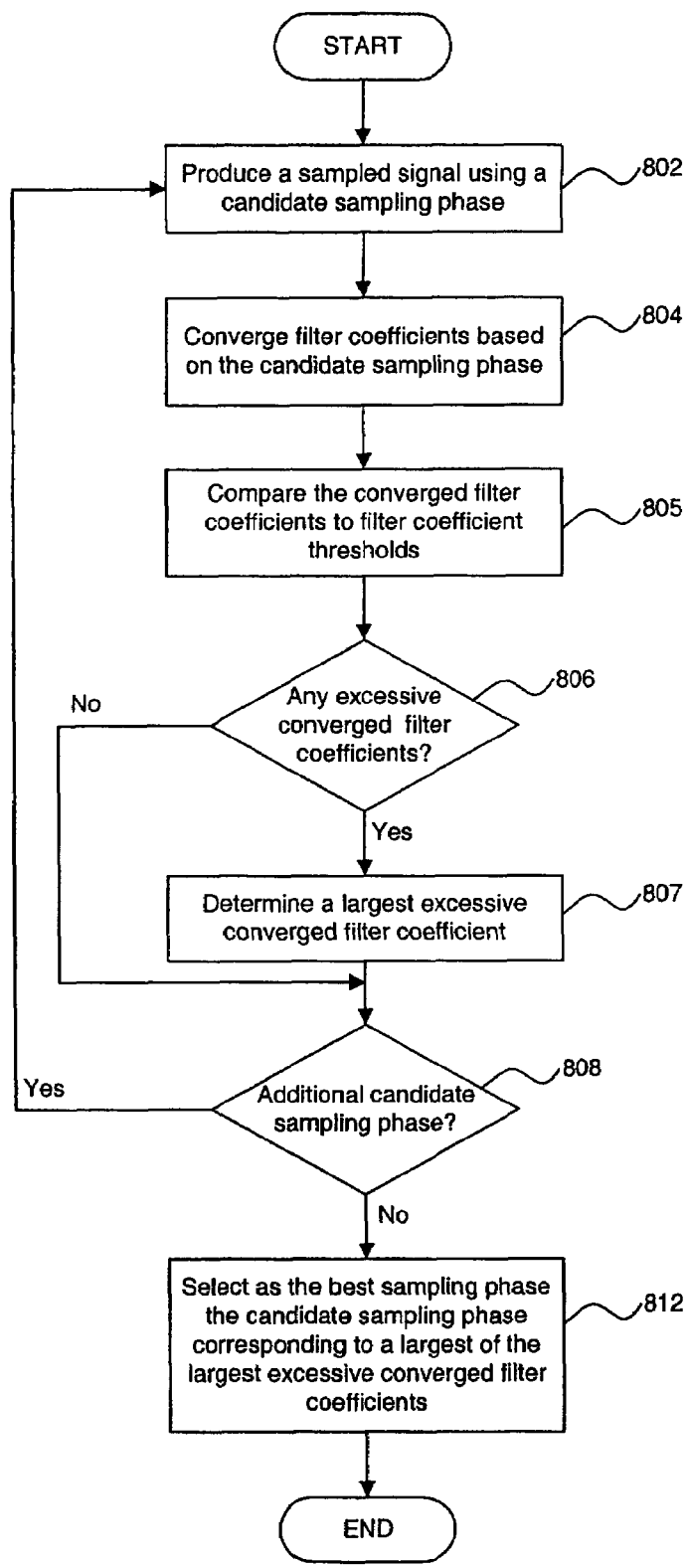
FIG. 8 is a flowchart of an example method of fine-tuning a received signal sampling phase in a transceiver based on filter coefficients.

FIG. 8 is a flowchart of an example method 800 of fine-tuning a received signal sampling phase in an individual transceiver, using a set of filter coefficients and a predetermined set of filter coefficient thresholds corresponding to the set of filter coefficients. Method 800 may be implemented in an apparatus, such as a receiver (for example, receive path 206), or more generally, a transceiver 108a, under the control of controller module 254.

A step 802 includes producing a sampled signal using a candidate sampling phase. For example, ADC 226 produces digitized signal 232 using a candidate sampling phase of sample clock 229.

A next step 804 includes converging a set of filter coefficients based on the candidate sampling phase. For example, this may involve initializing the set of filter coefficients 236, then allowing the set of filter coefficients 236 to adapt to the sampled signal having the candidate sampling phase. For example, adaptive filter 234 converges filter coefficients C based on receive signal 232, in response to a converge command from controller 208.

A next step 805 includes comparing each filter coefficient in the set of converged filter coefficients 236 to a corresponding filter coefficient threshold in the set of filter coefficient thresholds (e.g., thresholds 260), in a manner as discussed above, for example, as in methods 500 and 600.

A next step 806 is a decision step. Step 806 includes determining if any of converged filter coefficients 236 exceed their corresponding coefficient thresholds (e.g., thresholds 260), as indicated at step 805. Together, steps 805 and 806 comprise determining if any of converged filter coefficients 236 are excessive, that is, if they exceed their corresponding thresholds (e.g., thresholds 260). Controller 208 performs steps 805 and 806.

If there are any excessive converged filter coefficients, then flow proceeds to a next step 807. Otherwise, flow proceeds to a next step 808.

Step 807 includes determining a largest excessive converged filter coefficient among the excessive converged filter coefficients 236 determined at steps 805 and 806. For example, controller 208 determines a largest one of the excessive converged filter coefficients. This largest excessive coefficient corresponds to the candidate sampling phase used in step 802 to produce signal 232. Steps 802–807 alone are considered an independent method of processing a received signal in a receiver.

A next step 808 is a decision step. If there is an additional candidate sampling phase to be tested, step 808 returns a "YES" signal and flow returns to step 802. If all candidate sampling phases have been tested, then step 808 returns a "NO" signal and flow continues to a step 812.

Repetition of steps 802–808 produces one or more largest excessive converged filter coefficients corresponding to one or more respective candidate sampling phases, assuming step 808 returns at least one "YES" signal. Step 812 includes selecting as the best sampling phase the candidate sampling phase corresponding to a largest one of the largest excessive converged filter coefficients.

In method 800, steps 802–807 taken alone may be considered an independent method of processing a received signal in a receiver. The further steps 808–812, and the repetition of steps 802–807 for different candidate sampling phases, are necessary to select a best sampling phase among a plurality of candidate sampling phases.

Method 800 selects a best sampling phase that maximizes the adaptive filter coefficients. Once method 800 selects the best sampling phase, transceiver 108 executes the channel diagnostic methods described above, such as methods 500–604, using the best sampling phase. Method 800 and methods 500–604 may be used alternately to continuously fine tune the sampling phase used in transceiver 108 and in channel diagnostic methods 500–604.

Figure 9:
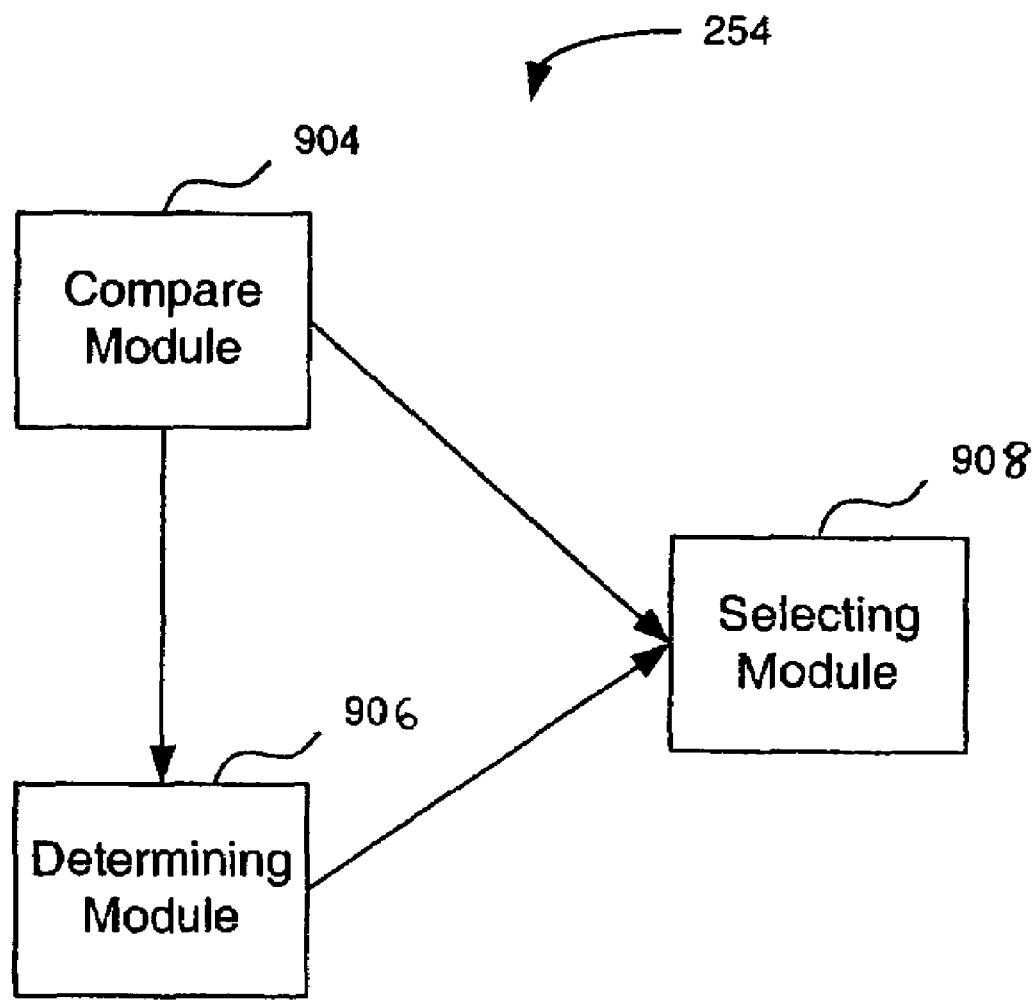
FIG. 9 is a block diagram of an example arrangement of a controller module used to implement portions of the method of FIG. 8.

FIG. 9 is a block diagram of an example arrangement of controller module 254, used to implement portions of method 800. Module 254 includes a compare module 904 for performing compare step 805 of method 800. Compare module 904 may include portions of compare module 750 discussed in connection with FIG. 7. Module 254 further includes a determining module 906 for performing steps 806 and 807. Module 254 also includes a select module 908 for performing step 812.

Threshold

Method 500 uses two main sets of filter coefficient thresholds stored in memory 250 to compare against the absolute values of the filter coefficients C. The first set of thresholds 260 indicative of channel faults (i.e., open/short thresholds 260) is used to determine the existence of and distance to a channel fault, while the second set of thresholds 262 indicative of channel length (i.e., length thresholds 262) is used to determine a channel length when no channel fault has been detected. Due to the nature of adaptive filter coefficients C, poor results may be obtained if all of the filter coefficients C are compared to a single threshold. This is due to the fact that filter coefficients C corresponding to larger tap numbers (and thus, larger time delay) tend to have smaller absolute values after they are properly converged. Thus, a set of thresholds including thresholds of different values is used in the present invention. For example, a staircase approach is used in the present invention for the open/short thresholds 260 and length thresholds 262. Filter coefficients C are divided into three or four groups, and each group has its own corresponding fixed threshold for open short thresholds 260 and length thresholds 262, each being somewhat smaller than the threshold for the previous group. Thus, the different threshold values follow a staircase of values.

Initial estimates for values of the open/short thresholds 260 and the length thresholds 262 for an Ethernet system have been determined using an exhaustive system and lab analysis of digital adaptive filtering of many actual twisted pair wires. This analysis has helped to determine that four (4) threshold groups in the open/short thresholds 260 are sufficient for the detection of channel faults. Three threshold groups in the length thresholds 262 are sufficient for the calculation of channel length. Furthermore, the analysis has given reasonable initial estimates for the sizes of each of the threshold groups, and the associated values corresponding to each threshold group. The initial estimates are shown in the following tables:

| INITIAL THRESHOLD GROUPS INDICATIVE OF CHANNEL FAULT | | | |
|---|---|---|---|
| OPEN/SHORT | FROM | TO | OPEN/SHORT THRESHOLDS 260 |
| GROUP 1 | 1 | 10 | 31232 |
| GROUP 2 | 11 | 20 | 17408 |
| GROUP 3 | 21 | 50 | 9984 |
| GROUP 4 | 51 | last | 3264 |
| | Coefficient Tap Numbers | | Coefficient Values (16-bit) |

TABLE 2

| INITIAL THRESHOLD GROUPS INDICATIVE OF CHANNEL LENGTH | | | |
|---|---|---|---|
| CHANNEL LENGTH | FROM | TO | LENGTH THRESHOLDS 262 |
| GROUP 1 | 1 | 10 | 5000 |
| GROUP 2 | 11 | 20 | 2500 |
| GROUP 3 | 21 | last | 400 |
| | Coefficient Tap Numbers | | Coefficient Values (16-bit) |

The reason the above values are called initial estimates is that method 500 has been implemented in systems that allow all the above values to be modified by the user. This allows fine-tuning of the thresholds in the tables during further testing and use.

Polynomials

In addition to the open/short thresholds 260 and the length thresholds 262 mentioned above, there are several other variables that can be fine-tuned by the user. These are the constants within the polynomial constant database stored in memory 248. For the channel fault distance calculation A*t+B=length, the variable A is called the Open/Short Polynomial (Py) Linear term, and B is called the Open/Short Polynomial Constant term, and A and B are contained in the set of constants 256 indicative of channel fault.

In the channel length calculation C*t+D=length, the variable C (not to be confused with filter coefficients C) is called the Channel Length Polynomial Linear term, and D is called the Channel Length Polynomial Constant term, and C and D are contained in the second set of constants 258 indicative of channel length.

Initial estimates for these terms are given in the following chart, along with example calculations:

TABLE 3

LENGTH CALCULATION POLYNOMIAL TERMS

| TERM | INITIAL ESTIMATE |
|---|---|
| Open/Short Py Linear term (A) | 0.87109 |
| Open/Short Py Constant term (B) | −6.0 |
| Channel Length Py Linear term (C) | 0.83594 |
| Channel Length Py Constant term (D) | −6.75 |

For example, when the tap number (t) is 72, the resulting channel fault distance is 0.87109 * 72−6.0, or approximately 57 meters.

When the tap number is 45, the resulting channel length is 0.83594 * 45−6.75, or approximately 31 meters.

Software Based Determinations of Cable Diagnostics

Determination of Whether a Cable Is Linked, Open, or Short

Figure 10:
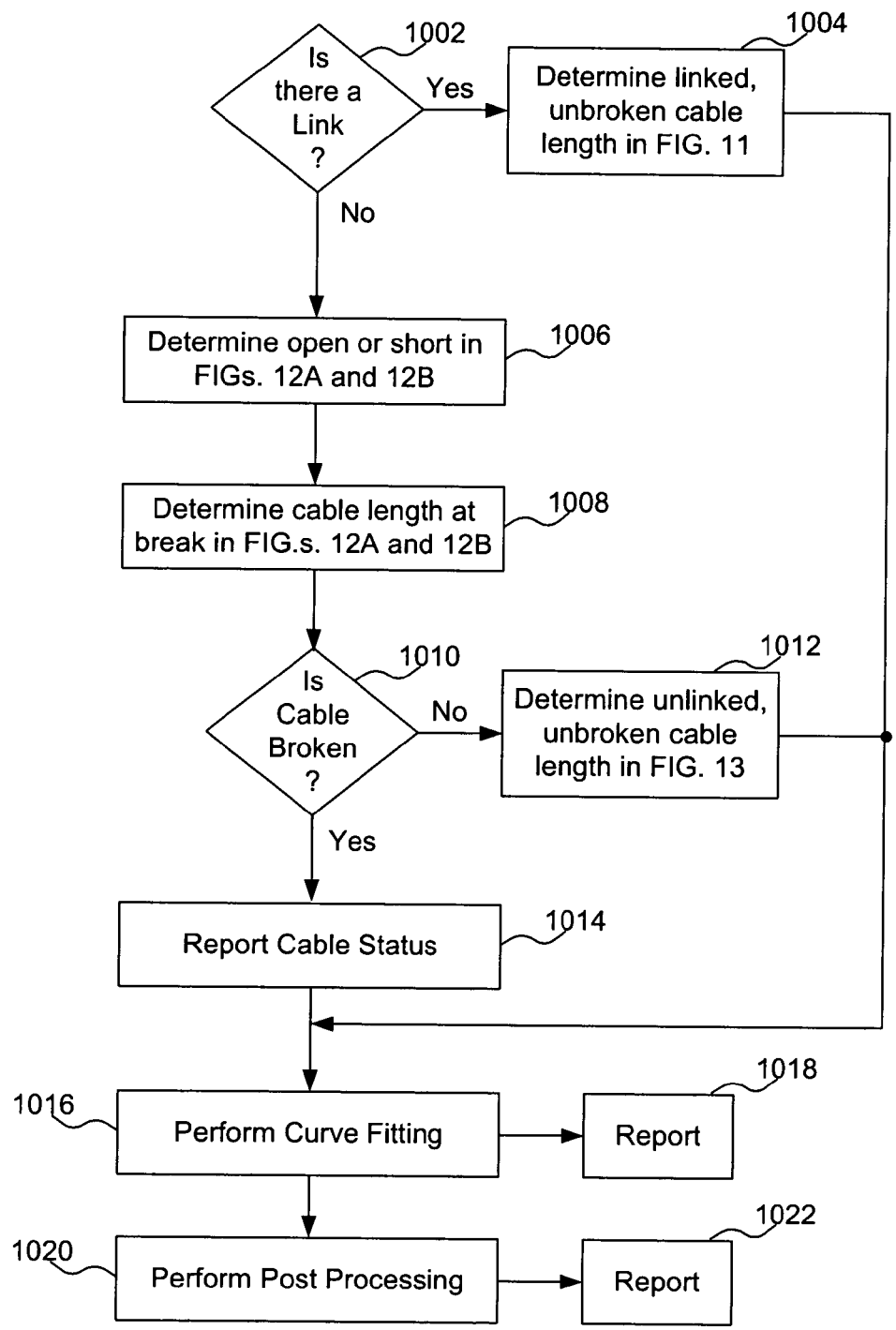
FIG. 10 is a flowchart depicting a method for performing channel diagnostics according to embodiments of the present invention.

FIG. 10 shows a flowchart depicting a software/algorithm based method 1000 for determining cable diagnostics according to embodiments of the present invention. Using software and/or algorithms allows for using more threshold values, allows for a second processing pass for determining channel faults, can look at a number of phases of the condition of cables, can perform post processing and/or curve fitting of channel length of a distance to channel fault, and can determine a type of channel fault. All of these features are described in more detail below. Other features resulting from a software and/or algorithm based implementation are discussed below, and contemplated within the scope of the present invention.

Figure 11:
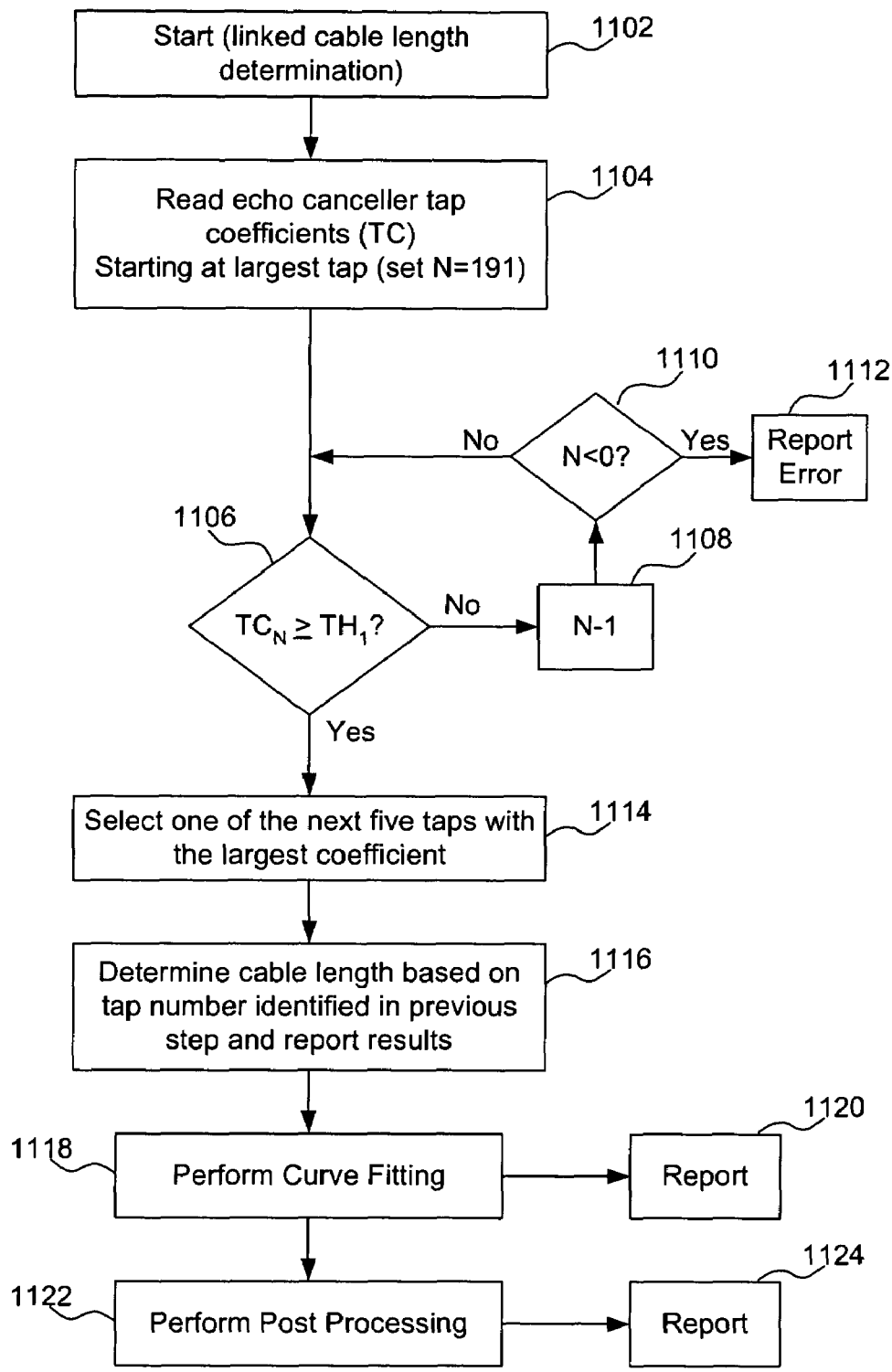
FIG. 11 is a flowchart depicting a method of determining cable length for a linked, unbroken cable according to embodiments of the present invention.

At step 1002, a determination is made whether a link exists between two devices sharing a cable. For example, whether one or both the devices are on and ready to receive/transmit data, or whether one or both devices are unavailable. If there is a link, in step 1004, a length of a linked, unbroken cable is determined and method 1000 moves to step 1016. In one embodiment, method 1100 in FIG. 11 is used to determine this length. If there is no link, then method 1000 moves to step 1006.

In step 1006, a type of break, e.g., cable open or cable short, is determined. In one embodiment, this can be done using method 1200 in FIGS. 12A and 12B. For example, a polarity of the coefficient that is determined to be the spike coefficient can determine whether there is a cable open or a cable short. When the polarity is positive there is a cable open. When the polarity is negative there is a cable short.

In step 1008, a position along the cable at which the break occurs is determined. In one embodiment, this can be done using method 1200 in FIGS. 12A and 12B. For example, a tap number of where the spike occurred can be used to determine at length of the cable at the spike.

In step 1010, a determination is made whether the cable is broken. In one embodiment, method 1200 in FIG. 12A can be used. For example, a break can be determined through detection of a spike in a coefficient value. A spike indicates an abnormality in the cable (e.g., a cable open condition or a cable short condition). If no spike is detected, i.e., the cable is not broken, at step 1012 a length of the unlinked, unbroken cable is determined and method 1000 moves to step 1016. In one embodiment, method 1300 in FIG. 13 can be used. If there is a spike detected, i.e., the cable is broken, method 1000 moves to step 1016.

In step 1014, the characteristics of the cable determine during method 1000 are reported or indicated. However, one or two optional steps can occur before the results are reports. First, a curve fitting step 1016 can occur. Second, a post processing step 1020 can occur. Both of these optional steps are described in more detail below.

In optional step 1016, a curve fitting process can be performed to adjust the distance measurement to the spike in the cable using a polynomial algorithm. For example, curve fitting in step 1022 can be based on $Y=Ax^2+Bx+C$, wherein Y is the adjusted length, x is the determined length, and A, B, and C are predefined constants using empirical data. In other embodiments, there can be a plurality of polynomials (e.g., a plurality of sets of A, B, and C) used depending on the distance to the spike. This is because it can be more difficult to determine an accurate distance to the spike in the beginning (e.g., 0–50 m) or the end (e.g., 150 m–192 m) of the cable than a middle (e.g., 50 m–150 m) of the cable. In still further embodiments, when a spike is detected (discussed below), the curve fitting polynomial used and/or modified depending on whether what caused the spike (e.g., a cable open condition or cable short condition). In still further embodiments, discussed below, when a linked, unbroken or unlinked, unbroken cable is detected, and a length of the cable is determined, the curve fitting polynomial can be used/and or modified for that specific situation.

Thus, one polynomial (or set thereof) can be used for no spike being detected with a link detected, one polynomial (or set thereof) can be used for no spike being detected with no link detected, one polynomial (or set thereof) can be used for an cable open condition, and one polynomial (or set thereof) can be used for a cable short condition.

For example, there can be nine polynomials to chose from: one for each condition: no fault, cable open, and cable short and then three per condition based on a distance to the fault or a length of the cable if no fault exists.

It is to be appreciated that other variations of curve fitting algorithms can also be used, which all are contemplated within the scope of the present invention.

In step 1018, a report would be generated based on the curve fitting results.

In optional at step 1020, one or more post processing algorithms can be performed. Basically, all of the final results are post-processed to determine if the results are realistic or within a predefined range of empirical results. If the results are found to be unrealistic or outside the range, one of two further steps can occur: (1) further processing to determine more accurate results or (2) indicating no results can be determined from the data.

In the first case, further processing can occur to determine if a more accurate result is possible based on all the data collected. For example, a determination is made whether: a different type of fault should have been determined, no fault should have been determined, a different length of a cable or location of the fault should have been determined, etc. There are numerous variations as to what can be done, all of which are contemplated within the scope of the present invention.

In step 1022, a report can be generated. For example, either a new result can be indicated or an indication can be made that no result is possible for one or more variables.

In the second case, no additional processing is done and an indication is made that no results are possible for one or more variables.

It is to be appreciated that other post-processing can also occur as would be known to a skilled artisan, and all are contemplated within the scope of the present invention.

Linked, Unbroken Cable Length Determination

FIG. 11 is a flowchart depicting a method 1100 for determining cable length of a linked, unbroken cable according to embodiments of the present invention. In step 1102, method 1100 starts. In step 1104, echo canceller tap coefficients (TC) are read starting with a largest tap (set N=191). In step 1106, a determination is made whether $TC_N >$ a first set of threshold values ($TH_1$). If no, method 1100 continues to step 1108. If yes, method 1100 continues to step 1114.

If no at step 1106, in step 1108 N is reduced by 1 (N−1). In step 1110, a determination is made whether N is less than 0 (zero). If yes, in step 1112, an error report is generated. If no, method 1100 returns to step 1106.

If yes at step 1106, in step 1114, one of the next five taps with the largest coefficient is selected. In step 1116, a cable length is determined based on a tap number identified in step 1114 and a result is reported.

Similar to method 1000, there are two optional steps, each generating their own report or one generating a combined report. In step 1118, curve fitting can be performed, results of which are report in step 1120. In step 1122, post-processing can be performed, results of which (or results of both) can be reported in step 1124.

Determination of Cable Length Information for Unlinked, Broken Cable

Figure 12A:
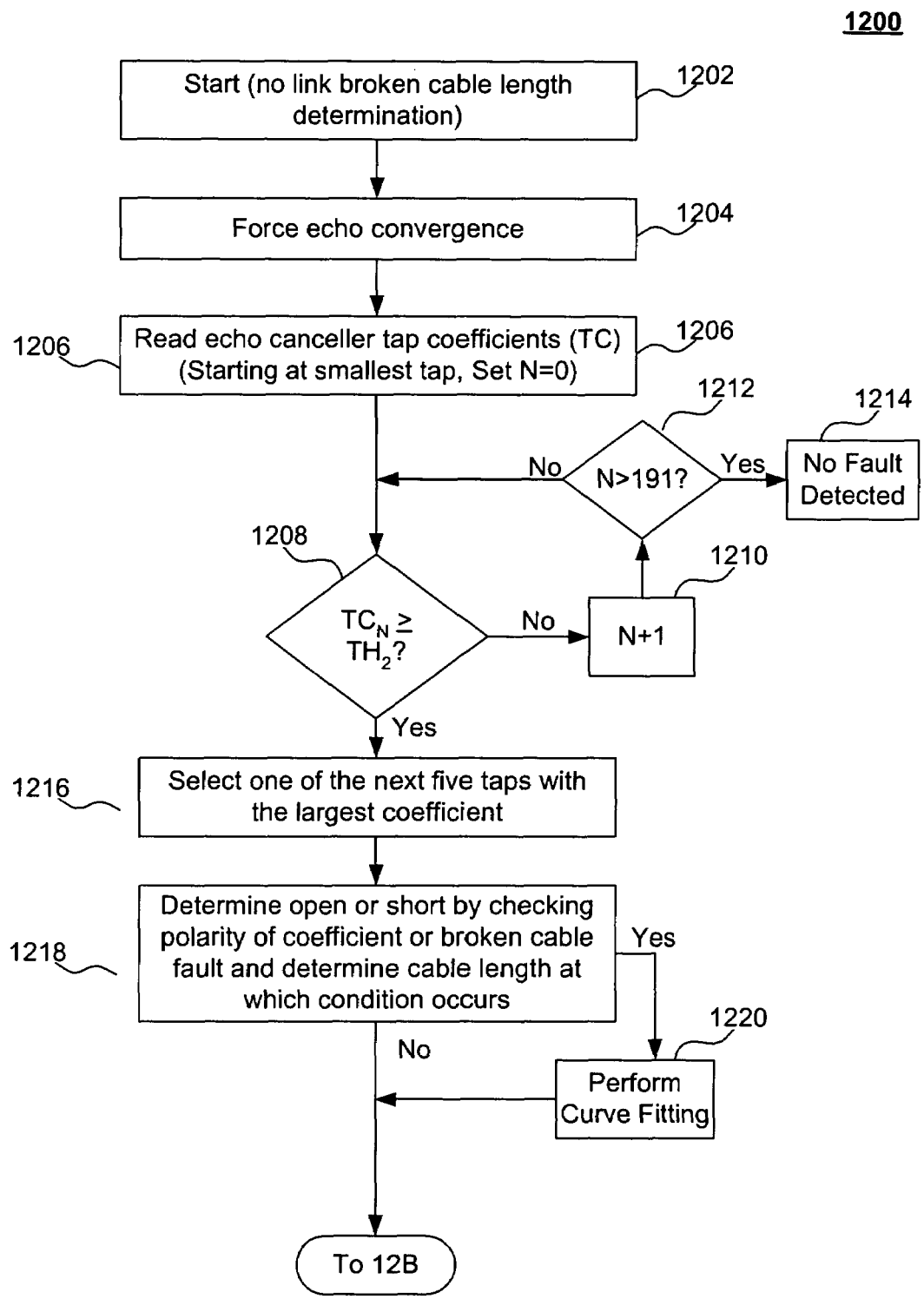
FIGS. 12A–12B is a flowchart depicting a method of determining if a fault exists on a cable according to embodiments of the present invention.
Figure 12B:
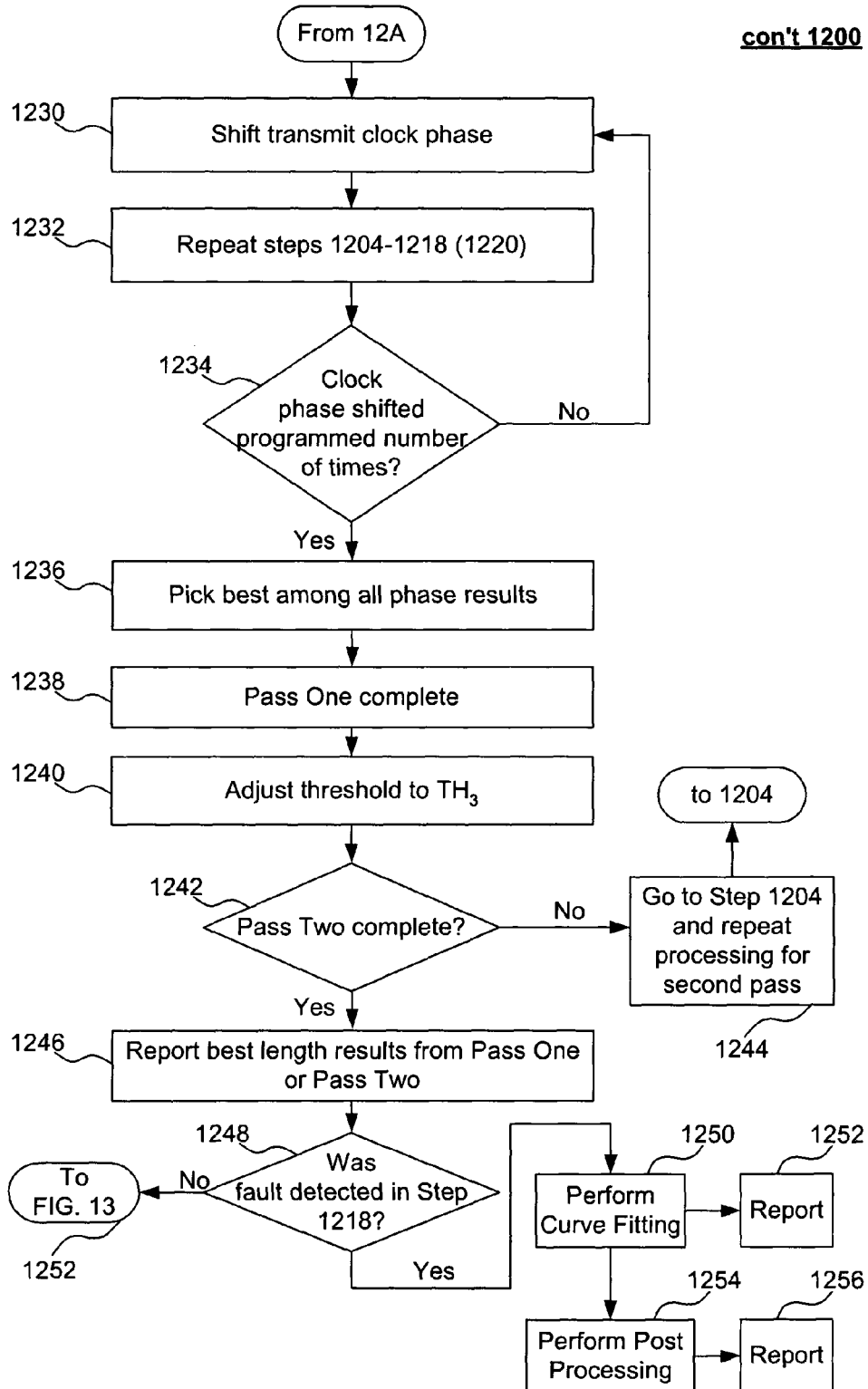

FIGS. 12A and 12B show a flowchart depicting a method 1200 for determining a cable fault in an unlinked cable according to embodiments of the present invention. Method 1200 starts at step 1202. In step 1204, echo convergence is forced. In step 1206, echo canceller tap coefficients (TC) are read starting at the smallest tap, while setting N=0 (zero). In step 1208, a determination is made whether $TC_N >$ a second set of threshold values ($TH_2$). If no, method 1200 continues to step 1210. If yes, method 1200 continues to step 1216.

If yes at step 1208, in step 1210 N is increased by 1 (N+1). In step 1212, a determination is made whether N is greater than 191. If yes, in step 1214 an indication is made that no fault is detected. If no, method 1200 returns to step 1208.

If no at step 1208, in step 1216 one of the next five taps with the largest coefficient is selected. In step 1218, a determination is made whether there is a short circuit, open circuit, or broken cable, and at what cable length the condition occurs. This can be done using a polarity of the largest coefficient determined in step 1216. As discussed above, a positive polarity indicates a cable open, while a negative polarity indicates a cable short. However, other methods for determining cable open and cable short are contemplated within the scope of the present invention.

There is one optional step, in step 1220, curve fitting can be performed. After curve fitting is performed, method 1200 moves on to step 1230 in FIG. 12B

In step 1230, a transmit clock phase is shifted. In step 1232, steps 1204–1218 (optionally 1220) are repeated. In step 1234, a determination is made whether the clock phase was shifted a programmed number of times. In one example, this can be three or four times. In other examples, any number of desired shifts can be made and determined. If no at step 1234, method 1200 returns to step 1230. If yes, method 1200 continues to step 1236.

In step 1236, a best result is chosen among all the phase results. In step 1238, pass one is completed. In step 1240, an adjustment of a third set of threshold values value ($TH_3$) is performed. In step 1242, a determination is made whether a second pass has been completed. If no, in step 1244 method 1200 returns to step 1204. If yes, method 1200 continues to step 1246, during which the best length results from pass one and pass two are reported.

In step 1248, a determination is made whether a channel fault was detected in step 1218. If yes, there are two optional steps, each generating their own report or one generating a combined report. In step 1250, curve fitting can be performed, results of which are report in step 1252. In step 1254, post-processing can be performed, results of which (or results of both) can be reported in step 1256.

Determination of Cable Length for Unlinked, No Fault Cable

Figure 13:
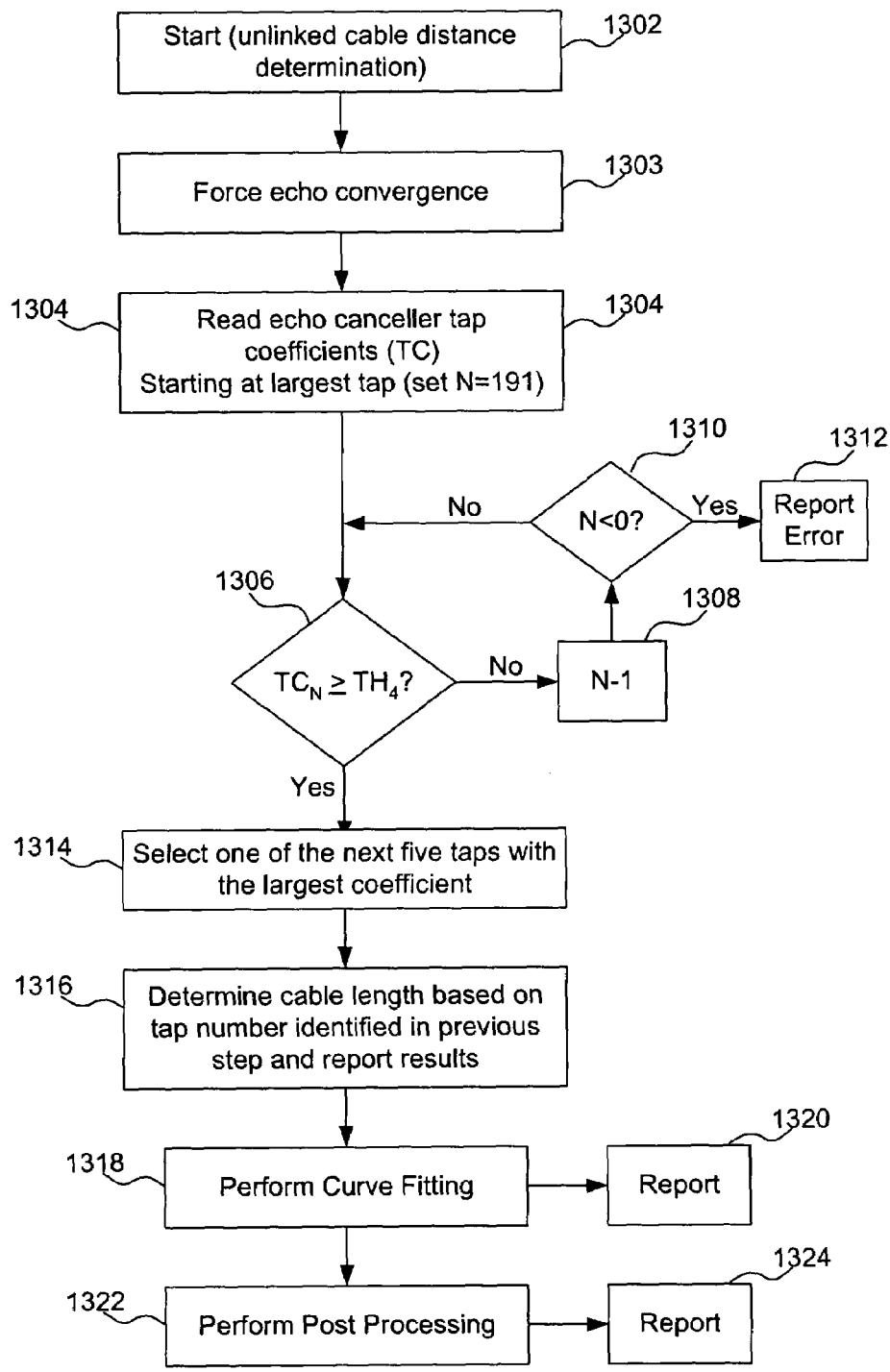
FIG. 13 is a flowchart depicting a method of determining a location of a fault determined in FIGS. 12A–12B.

FIG. 13 shows a flowchart depicting a method 1300 used to determine a distance of an unlinked cable having no faults according to embodiments of the present invention. In step 1302, method 1300 starts. In step 1303, echo convergence is forced. In step 1304, echo canceller tap coefficients (TC) are read starting with a largest tap (set N=191). In step 1306, a determination is made whether $TC_N >$ a fourth set of threshold values (TH4). If no, method 1300 continues to step 1308. If yes, method 1300 continues to step 1314.

If no at step 1306, in step 1308 N is reduced by 1 (N−1). In step 1310, a determination is made whether N is less than 0 (zero). If yes, in step 1312, an error report is generated. If no, method 1300 returns to step 1306.

If yes at step 1306, in step 1314, one of the next five taps with the largest coefficient is selected. In step 1316, cable length is determined based on a tap number identified in step 1314 and a result is reported.

There are two optional steps, each generating their own report or one generating a combined report. In step 1318, curve fitting can be performed, results of which are report in step 1320. In step 1322, post-processing can be performed, results of which (or results of both) can be reported in step 1324.

Example Implementations

A. Example Hardware/Software/Firmware Implementations

The present invention can be implemented in hardware, software, firmware, and/or combinations thereof, including, without limitation, gate arrays, programmable arrays ("PGAs"), fast PGAs ("FPGAs"), application-specific integrated circuits ("ASICs"), processors, microprocessors, microcontrollers, and/or other embedded circuits, processes and/or digital signal processors, and discrete hardware logic. The present invention is preferably implemented with digital electronics but can also be implemented with analog electronics and/or combinations of digital and analog electronics.

Figure 14:
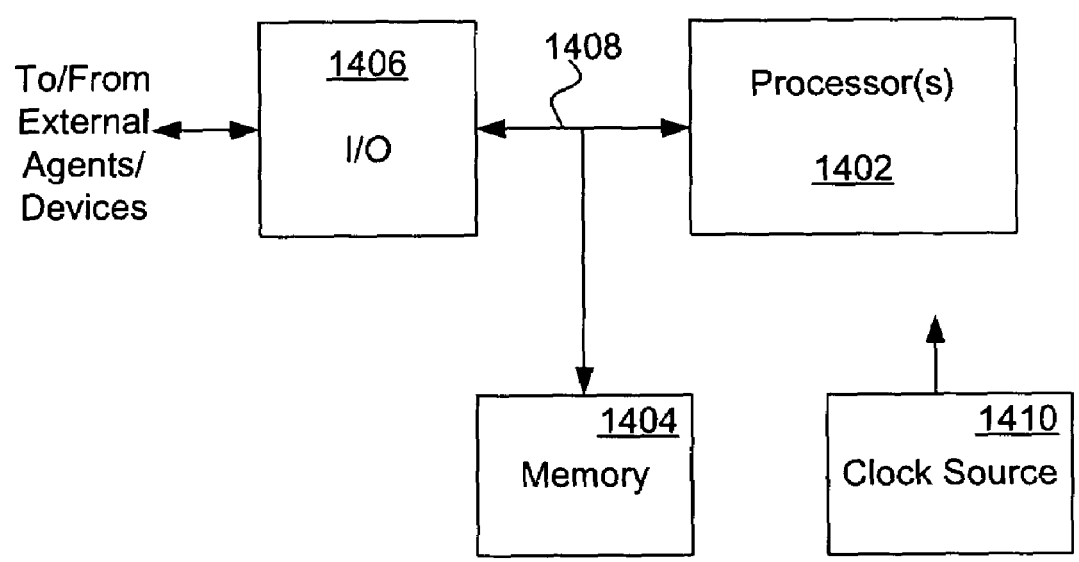
FIG. 14 is an illustration of an example processing system/environment in which the present invention can be implemented.

FIG. 14 illustrates an example processing system/environment 1400, in which the present invention can be implemented. Processing system 1400 includes a processor 1402 (or multiple processors 1402), a memory 1404, an input/output (I/O) interface (I/F) 1406, and a communication I/F 1408 coupled between the processor, memory, and I/O I/F. System 1400 may also include a local clock source 1410. System 1400 communicates with external agents/devices using I/O I/F 1406. I/O I/F 1406 can include interfaces for interfacing to external memory, external communication channels, external clocks and timers, external devices, and so on.

Memory 1404 includes a data memory for storing information/data and a program memory for storing program instructions. Processor 1402 performs processing functions in accordance with the program instructions stored in memory 1404. Processor 1402 can access data in memory 1404 as needed. Additionally, or alternatively, processor 1402 may include fixed/programmed hardware portions, such as digital logic, to perform some or all of the above-mentioned processing functions without having to access program instructions in memory 1404.

B. Example Computer Program Implementations

Figure 15:
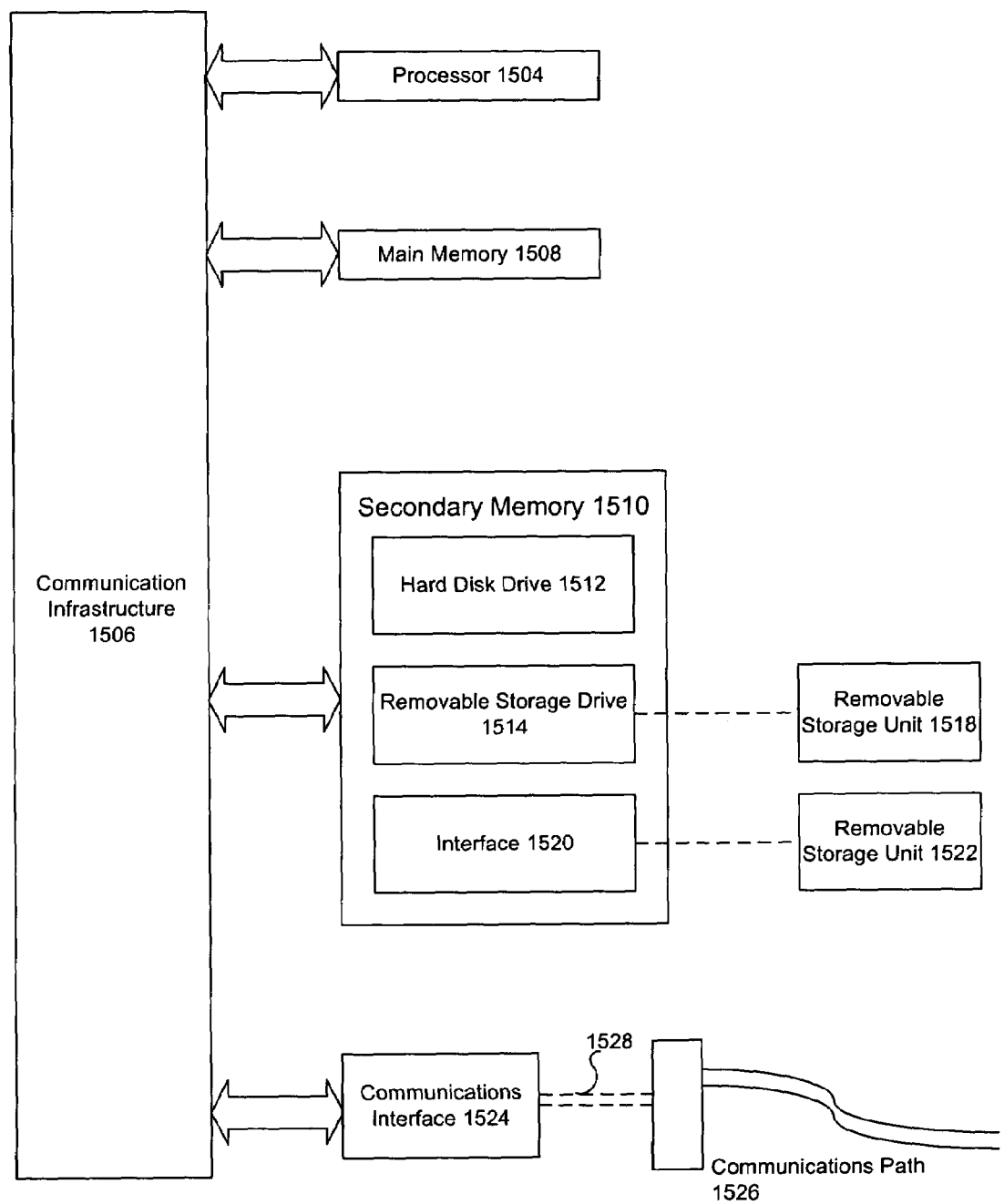
FIG. 15 is an example computer system that can be used in the present invention.

The present invention can also be implemented in computer-readable code, or software, that executes on a computer system. FIG. 15 illustrates an example computer system 1500, in which the present invention can be implemented as computer-readable code. Various embodiments of the invention are described in terms of this example computer system 1500. After reading this description, it will become apparent to a person skilled in the relevant art how to implement the invention using other computer systems and/or computer architectures.

The computer system 1500 includes one or more processors, such as processor 1504. Processor 1504 can be a special purpose or a general purpose digital signal processor. The processor 1504 is connected to a communication infrastructure 1506 (for example, a bus or network). Various software implementations are described in terms of this exemplary computer system. After reading this description, it will become apparent to a person skilled in the relevant art how to implement the invention using other computer systems and/or computer architectures.

Computer system 1500 also includes a main memory 1508, preferably random access memory (RAM), and may also include a secondary memory 1510. The secondary memory 1510 may include, for example, a hard disk drive 1512 and/or a removable storage drive 1514, representing a floppy disk drive, a magnetic tape drive, an optical disk drive, etc. The removable storage drive 1514 reads from and/or writes to a removable storage unit 1518 in a well known manner. Removable storage unit 1518, represents a floppy disk, magnetic tape, optical disk, etc. which is read by and written to by removable storage drive 1514. As will be appreciated, the removable storage unit 1518 includes a computer usable storage medium having stored therein computer software and/or data.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communications interface 1524. Communications interface 1524 allows software and data to be transferred between computer system 1500 and external devices. Examples of communications interface 1524 may include a modem, a network interface (such as an Ethernet card), a communications port, a PCMCIA slot and card, etc. Software and data transferred via communications interface 1524 are in the form of signals 1528 which may be electronic, electromagnetic, optical or other signals capable of being received by communications interface 1524. These signals 1528 are provided to communications interface 1524 via a communications path 1526. Communications path 1526 carries signals 1528 and may be implemented using wire or cable, fiber optics, a phone line, a cellular phone link, an RF link and other communications channels.

In this document, the terms "computer program medium" and "computer usable medium" are used to generally refer to media such as removable storage drive 1514, a hard disk installed in hard disk drive 1512, and signals 1528. These computer program products are means for providing software to computer system 1500.

Computer programs (also called computer control logic) are stored in main memory 1508 and/or secondary memory 1510. Computer programs may also be received via communications interface 1524. Such computer programs, when executed, enable the computer system 1500 to implement the present invention as discussed herein. In particular, the computer programs, when executed, enable the processor 1504 to implement the processes of the present invention. Accordingly, such computer programs represent controllers of the computer system 1500. Where the invention is implemented using software, the software may be stored in a computer program product and loaded into computer system 1500 using removable storage drive 1514, hard drive 1512 or communications interface 1524.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof, as was described above in connection with FIGS. 14 and 15, for example. Thus, the breadth and scope of the present invention should not be limited by any of the above-described exemplary embodiments, but should be defined only in accordance with the following claims and their equivalents.

What is claimed is:

1. A method of determining information about a communication channel using an adaptive filter coupled to the channel, the adaptive filter including adaptive filter coefficients, comprising:
   a) comparing the filter coefficients to filter coefficient thresholds;
   b) determining if one of a communication link and a channel fault exists, and if a channel fault exists determining if one of,
      i) a cable open condition exists in the channel, and
      ii) a cable short condition exists in the channel; and
   c) indicating whether the channel is one of linked, open, and shorted;
   d) determining when a given filter coefficient one of meets and exceeds a corresponding filter coefficient threshold;
   e) comparing only a further subset of filter coefficients to corresponding ones of a subset of the filter coefficient thresholds;
   f) identifying a largest one of the given filter coefficient and the further subset of filter coefficients; and
   g) determining the channel length based on the largest coefficient identified in the previous step.

2. The method of claim 1, wherein step (a) further comprises:
   comparing the filter coefficients to corresponding filter coefficient thresholds in an order of increasing filter time delay associated with each of the filter coefficients.

3. The method of claim 1, wherein the thresholds include thresholds indicative of a channel length.

4. The method of claim 1, further comprising performing curve fitting for the length of the channel using a polynomial algorithm.

5. The method of claim 1, further comprising performing curve fitting for the length of the channel using a set of polynomial algorithms.

6. The method of claim 1, wherein the filter coefficient thresholds include varying thresholds.

7. The method of claim 1, wherein the filter coefficient thresholds include varying thresholds that follow a staircase of values.

8. The method of claim 1, further comprising, prior to step (a):
   bypassing a filter convergence operation that converges the set of filter coefficients if a valid communication link exists.

9. The method of claim 1, wherein if the channel is linked, further comprising:
   h) determining a length of the channel.

10. The method of claim 9, wherein step h) comprises:
    i) determining a number of taps for the channel, wherein the number of taps is indicative of the length of the channel.

11. The method of claim 1, wherein if the channel fault exists, further comprising:
    h) determining a distance to the channel fault.

12. The method of claim 11, wherein step h) comprises:
    determining a number of taps before a spike in a filter coefficient value, wherein the number of taps is indicative of the distance to the channel fault.

13. The method of claim 11, further comprising, prior to step (a):
    converging the set of filter coefficients.

14. The method of claim 1, wherein before step b) further comprises:
    determining a polarity of a filter coefficient corresponding to a spike in the filter coefficients.

15. The method of claim 14, wherein when the polarity is positive, the cable open condition exists.

16. The method of claim 14, wherein when the polarity is negative, the cable short condition exists.

17. A method of determining information about a communication channel using an adaptive filter coupled to the channel, the adaptive filter including adaptive filter coefficients, comprising:
    a) comparing the filter coefficients to filter coefficient thresholds;
    b) determining if one of a communication link and a channel fault exists, and if a channel fault exists determining if one of,
       i) a cable open condition exists in the channel, and
       ii) a cable short condition exists in the channel;
    c) indicating whether the channel is one of linked, open, and shorted;
    d) determining when a given filter coefficient either one of meets and exceeds a corresponding filter coefficient threshold;
    e) comparing only a further subset of filter coefficients to corresponding ones of a subset of the filter coefficient thresholds;
    f) identifying a largest one of the given filter coefficient and the further subset of filter coefficients; and
    g) determining a distance to the channel fault based on the largest coefficient identified in step f).

18. The method of claim 17, wherein step (a) further comprises:
    comparing the filter coefficients to corresponding ones of filter coefficient thresholds in an order of decreasing filter time delay associated with each of the filter coefficients.

19. The method of claim 17, further comprising:
    h) adjusting values of the thresholds; and
    i) repeating the steps d) through t) for the adjusted thresholds.

20. The method of claim 17, wherein the thresholds include thresholds indicative of a channel fault.

21. The method of claim 17, further comprising performing curve fitting for the distance to the channel fault using a polynomial algorithm.

22. The method of claim 17, further comprising performing curve fitting for the distance to the channel fault using a set of polynomial algorithms.

23. The method of claim 17, wherein the filter coefficient thresholds include varying thresholds.

24. The method of claim 17, wherein the filter coefficient thresholds include varying thresholds that follow a staircase of values.

25. The method of claim 17, further comprising, prior to step (a):
    bypassing a filter convergence operation that converges the set of filter coefficients if a valid communication link exists.

26. The method of claim 17, further comprising:
    h) producing a sampled signal from a received signal via the channel using a candidate sampling phase;
    i) converging the filter coefficients based on the candidate sampling phase;
    j) comparing the converged filter coefficients to filter coefficient thresholds; and k) determining a largest filter coefficient among one or more excessive filter coefficients that exceed corresponding coefficient thresholds.

27. The method of claim 26, further comprising:
l) repeating steps h) through k) using different candidate sampling phases, thereby determining one or more largest filter coefficients for one or more respective candidate sampling phases; and
m) selecting as a best sampling phase the candidate sampling phase corresponding to a largest one of all of the largest filter coefficients.

28. The method of claim 17, wherein if the channel is linked, further comprising:
h) determining a length of the channel.

29. The method of claim 28, wherein step h) comprises:
i) determining a number of taps for the channel, wherein the number of taps is indicative of the length of the channel.

30. The method of claim 17, wherein if the channel fault exists, further comprising:
h) determining a distance to the channel fault.

31. The method of claim 30, wherein step h) comprises:
determining a number of taps before a spike in a filter coefficient value, wherein the number of taps is indicative of the distance to the channel fault.

32. The method of claim 30, further comprising, prior to step (a):
converging the set of filter coefficients.

33. The method of claim 17, wherein before step b) further comprises:
determining a polarity of a filter coefficient corresponding to a spike in the filter coefficients.

34. The method of claim 33, wherein when the polarity is positive, the cable open condition exists.

35. The method of claim 33, wherein when the polarity is negative, the cable short condition exists.

36. A method of determining information about a communication channel using an adaptive filter coupled to the channel, the adaptive filter including adaptive filter coefficients, comprising:
a) comparing the filter coefficients to filter coefficient thresholds;
b) determining if one of a communication link and a channel fault exists, and if a channel fault exists determining if one of,
i) a cable open condition exists in the channel, and
ii) a cable short condition exists in the channel; and
c) indicating whether the channel is one of linked, open, and shorted, and if the channel is linked determining a length of the channel;
d) performing post-processing techniques, such that a determination is made whether the length of the cable is within a predetermined range;
i) re-determining the length of the cable and indicating the length of the cable is indeterminable when the length of the cable is outside the predetermined range.

37. A method of determining information about a communication channel using an adaptive filter coupled to the channel, the adaptive filter including adaptive filter coefficients, comprising:
a) comparing the filter coefficients to filter coefficient thresholds;
b) determining if one of a communication link and a channel fault exists, and if a channel fault exists determining if one of,
i) a cable open condition exists in the channel, and
ii) a cable short condition exists in the channel;
c) indicating whether the channel is one of linked, open, and shorted, and if the channel fault exists determining a distance to the channel fault;
d) perform post-processing techniques, such that a determination is made whether the distance to the cable fault is within a predetermined range, and if the distance to the cable fault is outside the predetermined range doing one of,
i) re-determining the distance to the cable fault; and
ii) indicating the distance to the cable fault is indeterminable.

* * * * *

UNITED STATES PATENT AND TRADEMARK OFFICE
CERTIFICATE OF CORRECTION

PATENT NO. : 7,239,680 B2 Page 1 of 1
APPLICATION NO. : 10/641011
DATED : July 3, 2007
INVENTOR(S) : Sang T. Bui It is certified that error appears in the above-identified patent and that said Letters Patent is hereby corrected as shown below:

In the Claims:
At column 20, line 41, "t)" should be replaced by --f)--.

Signed and Sealed this

Twenty-seventh Day of May, 2008

JON W. DUDAS
*Director of the United States Patent and Trademark Office*